(12) United States Patent
Terashima

(10) Patent No.: US 7,929,042 B2
(45) Date of Patent: Apr. 19, 2011

(54) IMAGING APPARATUS, CONTROL METHOD OF IMAGING APPARATUS, AND COMPUTER PROGRAM

(75) Inventor: Yoshito Terashima, Tokyo (JP)

(73) Assignee: Sony Corporation, Tokyo (JP)

( * ) Notice: Subject to any disclaimer, the term of this patent is extended or adjusted under 35 U.S.C. 154(b) by 495 days.

(21) Appl. No.: 11/826,575

(22) Filed: Jul. 17, 2007

(65) Prior Publication Data
US 2008/0074529 A1    Mar. 27, 2008

(30) Foreign Application Priority Data

Sep. 22, 2006 (JP) .................................. 2006-256688

(51) Int. Cl.
  *H04N 5/232* (2006.01)
  *G06K 9/40* (2006.01)
(52) U.S. Cl. ........................................ 348/345; 382/255
(58) Field of Classification Search .................. 348/135, 348/140, 345–354; 382/118, 255, 286
See application file for complete search history.

(56) References Cited

U.S. PATENT DOCUMENTS

| | | | |
|---|---|---|---|
| 5,003,339 A * | 3/1991 | Kikuchi et al. ............... | 396/100 |
| 5,170,202 A | 12/1992 | Bell | |
| 5,629,735 A * | 5/1997 | Kaneda et al. ............. | 241/199.3 |
| 5,687,402 A * | 11/1997 | Kishimoto et al. ............. | 396/80 |
| 5,835,616 A * | 11/1998 | Lobo et al. .................... | 382/118 |
| 6,118,484 A * | 9/2000 | Yokota et al. ................. | 348/350 |
| 6,292,575 B1 * | 9/2001 | Bortolussi et al. ............ | 382/118 |
| 7,298,412 B2 * | 11/2007 | Sannoh et al. ................ | 348/348 |
| 7,405,762 B2 * | 7/2008 | Nonaka et al. ................ | 348/348 |
| 7,573,505 B2 * | 8/2009 | Kawaguchi et al. ....... | 348/222.1 |
| 2002/0150308 A1 * | 10/2002 | Nakamura .................... | 382/286 |
| 2004/0263674 A1 | 12/2004 | Koreki | |
| 2006/0182433 A1 * | 8/2006 | Kawahara et al. ........... | 396/123 |
| 2007/0263997 A1 | 11/2007 | Hirai et al. | |

FOREIGN PATENT DOCUMENTS

| | | |
|---|---|---|
| JP | 09-054244 A | 2/1997 |
| JP | A-10-213737 | 8/1998 |
| JP | 2000-149018 A | 5/2000 |

(Continued)

OTHER PUBLICATIONS

English Translation of Chinese Office Action issued for corresponding Chinese Application No. 200710161817.7.

(Continued)

*Primary Examiner* — Lin Ye
*Assistant Examiner* — Trung Diep
(74) *Attorney, Agent, or Firm* — Rader, Fishman & Grauer PLLC

(57) ABSTRACT

An imaging apparatus is disclosed. The imaging apparatus includes: a face detecting part configured to detect a face area from an input image in the imaging apparatus; a measurement frame setting part configured to set a measurement frame corresponding to a face area that includes a face area and a measurement frame corresponding to a body area that includes a body area based on the face area detected in the face detecting part; and a focus control part configured to apply each of the plurality of the measurement frames set by the measurement frame setting part to detect in-focus positions corresponding to the individual measurement frames based on a check of information about the detected in-focus positions corresponding to the individual measurement frames, and to decide a final in-focus position.

12 Claims, 15 Drawing Sheets

FOREIGN PATENT DOCUMENTS

| | | |
|---|---|---|
| JP | 2001-304855 A | 10/2001 |
| JP | 2003-107335 | 4/2003 |
| JP | A-2004-133637 | 4/2004 |
| JP | 2004-219461 | 8/2004 |
| JP | 2004-317699 | 11/2004 |
| JP | 2006-208408 A | 8/2006 |
| JP | 2006-227080 A | 8/2006 |
| JP | 2007-304280 A | 11/2007 |
| JP | 2008-070640 A | 3/2008 |

OTHER PUBLICATIONS

Japanese Office Action for application No. 2006-256688 dated Jul. 22, 2008.

* cited by examiner

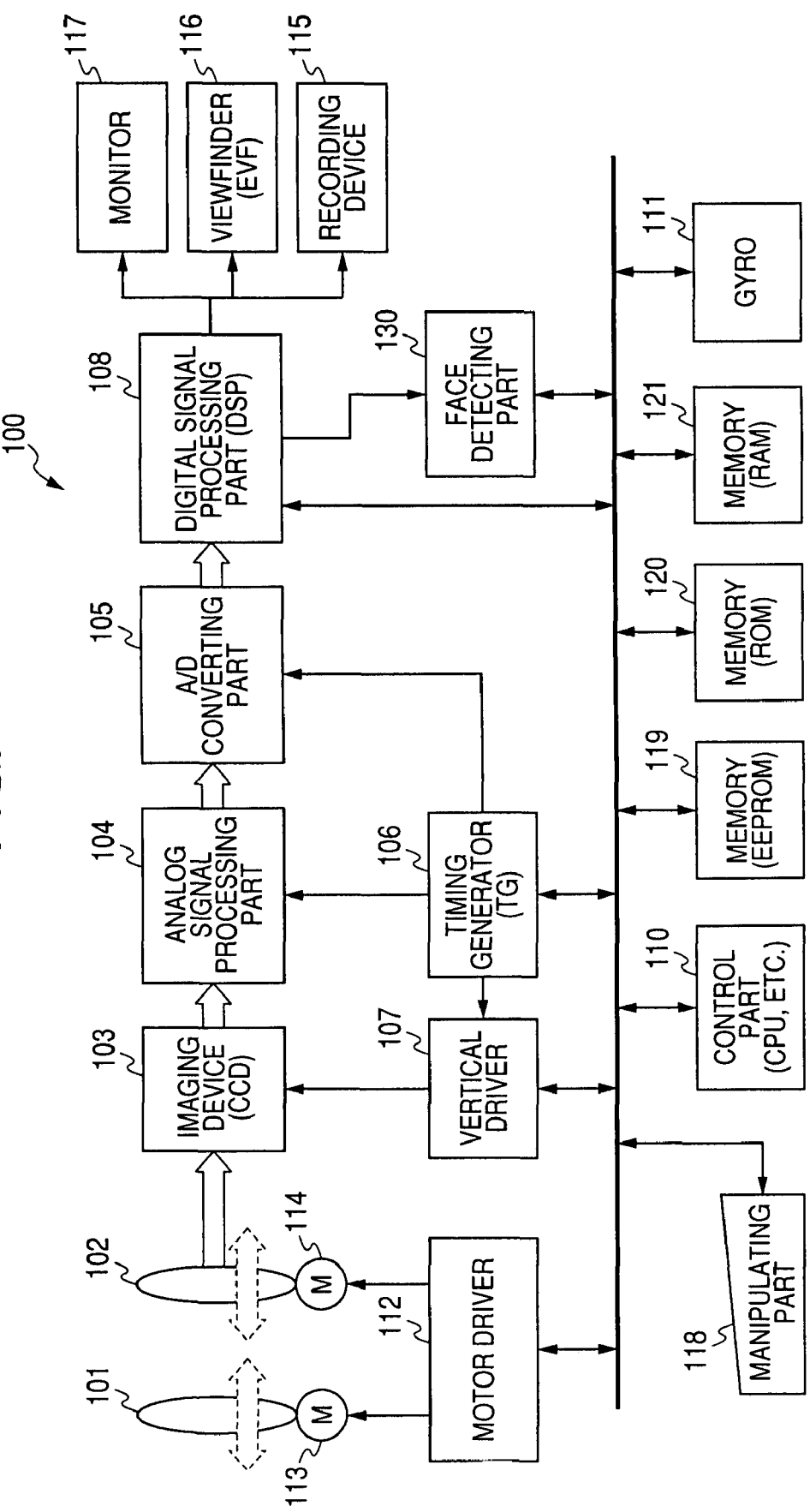

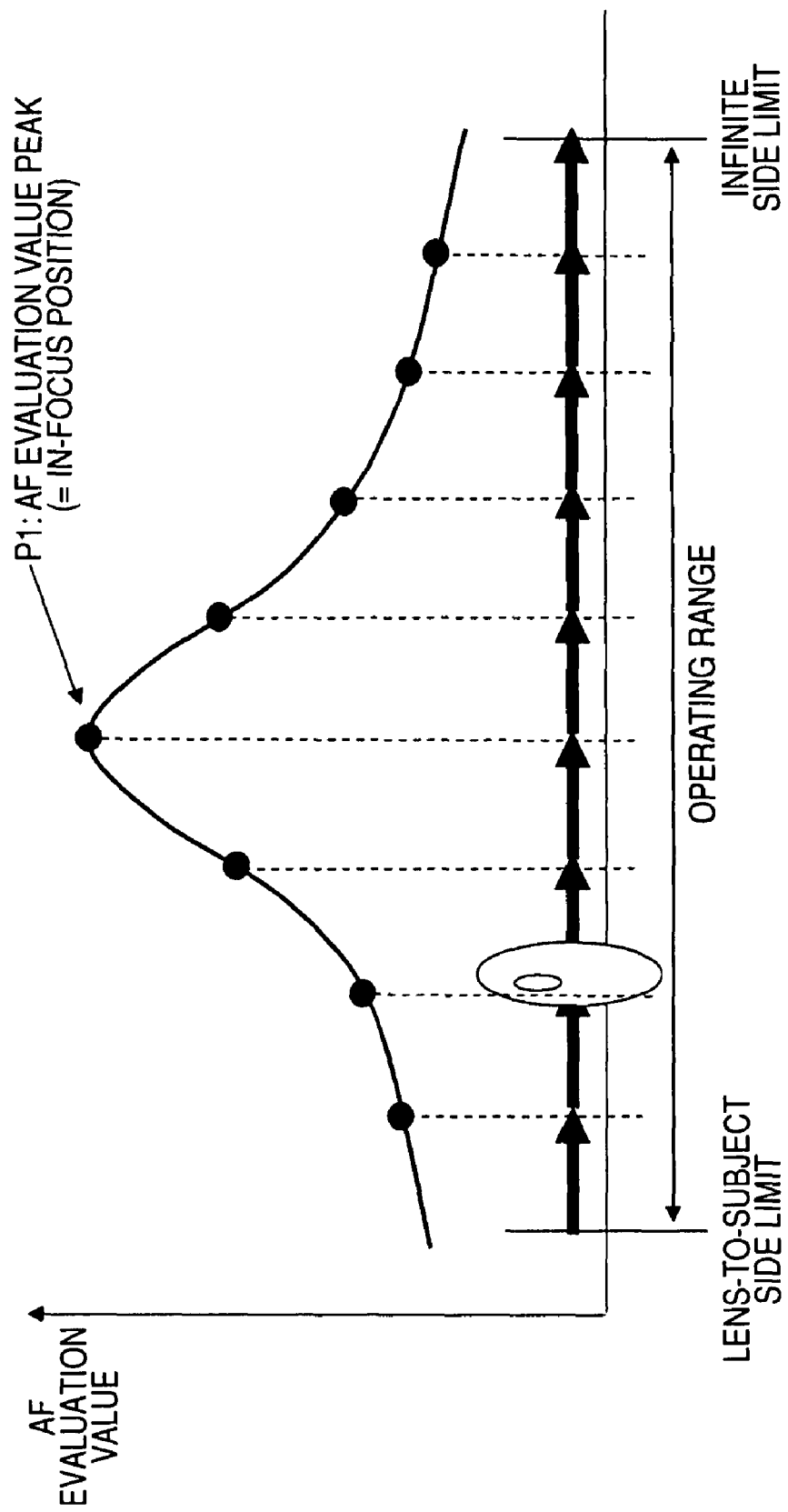

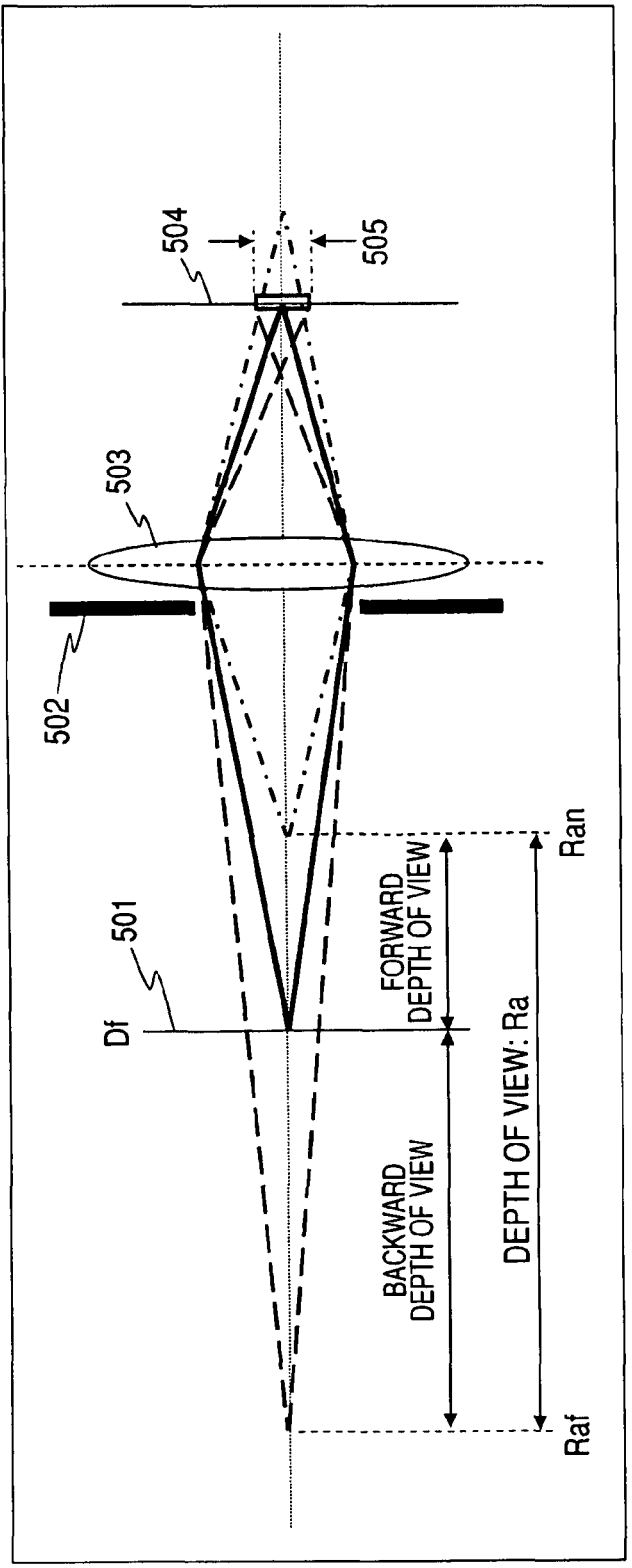

FIG. 13A

FIG. 13B $$Ra = \frac{Df^2 \times d \times F}{f^2 + Df \times d \times F} \sim \frac{Df^2 \times d \times F}{f^2 - Df \times d \times F}$$

$$\begin{pmatrix}\text{FORWARD DEPTH}\\\text{OF VIEW Ran}\end{pmatrix} \quad \begin{pmatrix}\text{BACKWARD DEPTH}\\\text{OF VIEW Raf}\end{pmatrix}$$

IF THE SUBJECT POSITION IS Df,
THE DIAMETER OF THE ALLOWABLE
CIRCLE OF CONFUSION IS d,
THE F VALUE (APERTURE) IS F, AND
THE LENS FOCAL LENGTH IS f,
THE DEPTH OF VIEW Ra IS:

IMAGING APPARATUS, CONTROL METHOD OF IMAGING APPARATUS, AND COMPUTER PROGRAM

CROSS REFERENCES TO RELATED APPLICATIONS

The present invention contains subject matter related to Japanese Patent Application JP 2006-256688 filed in the Japanese Patent Office on Sep. 22, 2006, the entire contents of which being incorporated herein by reference.

BACKGROUND OF THE INVENTION

1. Field of the Invention

The present invention relates to an imaging apparatus, a control method of an imaging apparatus, and a computer program. More specifically, the invention relates to an imaging apparatus, a control method of an imaging apparatus, and a computer program, which allow an accurate auto-focusing process for a target subject.

2. Description of the Related Art

Nowadays, many imaging apparatus such as a still camera and a video camera have an auto focusing (AF) mechanism mounted thereon which automatically bring a subject into focus. In addition, in recent years, in a camera having an auto focusing (AF) function, such a function, a so-called "Multi AF", or "multipoint range AF", is widely adopted, which measures a distance to a plurality of areas in a screen, selects the optimum area resulting from various priorities such as one being closest to a photographer, and one being closer to the center of the screen, and drives a lens to bring the area into focus. This function is applied to allow proper focusing for a main subject with no special operations done by a photographer even though the main subject is not always on the center of the screen.

However, such a Multi AF or multipoint range AF function does not serve for all purposes, and these functions do not always serve for all compositions. In general camera shooting, people are the main subject in a great many cases, but people are at many places in a taken image, and there are various compositions. In the first place, in some cases, a target subject is at the position at which the area to measure a distance is not set in an imaging apparatus. In this case, even though the Multi AF or multipoint range AF function is applied, people are not brought into focus properly.

In order to solve such problems, for example, in Patent Reference 1 (see JP-A-2004-219461), a method is proposed in which skin tone information is detected from an acquired image in an imaging apparatus, the area of the skin tone is assumed as the position of a face for measuring the distance. With this method, such a camera can be implemented that brings a person into focus in any compositions. However, the method has the disadvantage that it is difficult to exert functions well in bright and dark environments where detection performance of the face has little effect.

Furthermore, Patent Reference 2 (see JP-A-2003-107335) discloses a configuration in which a person's face is detected to improve the accuracy of detecting a person, not estimating a face position from skin tone information. In addition to this, it proposes a method in which parts such as a mouth, a nose, and eyes are detected to measure the distance to the parts. However, it is configured in which when a mouth, a nose, and eyes are detected, a user of a camera is allowed to select a part among them, not the camera, which demands user operation and does not implement simple shooting. Moreover, it is likely to lose a chance to take a picture while a user is making a selection of a part.

In the case of the configuration in which a face is detected based on an image acquired by a camera to measure the distance to the face, when the face area in the image acquired by the camera is too small, it causes a problem that this configuration tends to receive influence of an unstable camera and an unstable subject. Moreover, also in the case in which auto-focusing that detects the brightness difference of the face is adapted, there is an essential problem that it is difficult to detect the brightness difference.

For the configuration that solves such problems, Patent Reference 3 (see JP-A-2004-317699) proposes a method that changes a measuring area in accordance with the size of a face. It is the method that in the case in which a face is larger than a predetermined size and eyes are detected, the area that includes the eyes therein is set to a measuring area, and in the case in which a face is smaller than a predetermined size, a large frame that surrounds the face is set. However, according to the method, in the case in which zooming is used for shooting when a face is small, such a problem arises that the background comes into focus and the face is out of focus.

SUMMARY OF THE INVENTION

It is desirable to provide an imaging apparatus, and a control method of an imaging apparatus, and a computer program, which can perform an accurate auto-focusing process for a target subject.

More specifically, it is desirable to provide an imaging apparatus, and a control method of an imaging apparatus, and a computer program, which use a face detection function to set a measurement frame on a face area as well as to set a measurement frame on a body area other than a face, and an accurate in-focus position decision process is implemented to which the measurement frames are adapted.

An embodiment of the invention is an imaging apparatus including: a face detecting part configured to detect a face area from an input image in the imaging apparatus; a measurement frame setting part configured to set a measurement frame corresponding to a face area that includes a face area and a measurement frame corresponding to a body area that includes a body area based on the face area detected in the face detecting part; and a focus control part configured to apply each of the plurality of the measurement frames set by the measurement frame setting part to detect in-focus positions corresponding to the individual measurement frames based on a check of information about the detected in-focus positions corresponding to the individual measurement frames, and to decide a final in-focus position.

Furthermore, in the imaging apparatus according to an embodiment of the invention, the measurement frame setting part is configured to set three types of measurement frames below: a measurement frame corresponding to a face area that includes an entire face, a measurement frame corresponding to an in-face area that partially includes an in-face area, and a measurement frame corresponding to a body area that includes a body area other than a face, and the focus control part is configured to: apply each of the three types of the measurement frames set by the measurement frame setting part, detect in-focus positions corresponding to individual measurement frames, and decide a final in-focus position based on a check of information about the detected in-focus positions corresponding to the individual measurement frames.

Furthermore, in the imaging apparatus according to an embodiment of the invention, based on face area information detected by the face detecting part, the measurement frame setting part is configured to decide a setting position and size of three types of measurement frames below: a measurement frame corresponding to a face area that includes an entire face; a measurement frame corresponding to an in-face area that partially includes an in-face area; and a measurement frame corresponding to a body area that includes a body area other than a face, and to set the individual measurement frames.

Furthermore, in the imaging apparatus according to an embodiment of the invention, the focus control part is configured to measure changes in contrast in association with the movement of a focus lens for each of a plurality of different measurement frames, compute in-focus positions corresponding to individual measurement frames, and decide a final in-focus position based on a check of in-focus positions corresponding to the computed individual measurement frames.

Furthermore, in the imaging apparatus according to an embodiment of the invention, the focus control part is configured to check contrast of an image inside a plurality of measurement frames set by the measurement frame setting part, and in the case in which image data is low contrast, the focus control part is configured to invalidate in-focus position information that has been computed by applying a measurement frame, and not to apply the information to computing a final in-focus position.

Furthermore, in the imaging apparatus according to an embodiment of the invention, in the case in which at least two different in-focus positions corresponding to measurement frames are matched within a difference in a preset allowable range, the focus control part is configured to decide the matching point thereof as an in-focus position.

Furthermore, in the imaging apparatus according to an embodiment of the invention, the focus control part is configured to check three types of in-focus positions corresponding to measurement frames below: (a) an in-focus position obtained from a measurement result to which a measurement frame corresponding to a face area that includes an entire face is applied; (b) an in-focus position obtained from a measurement result to which a measurement frame corresponding to an in-face area that partially includes an in-face area; and (c) an in-focus position obtained from a measurement result to which a measurement frame corresponding to a body area that includes a body area other than a face, and in the case in which all the in-focus positions corresponding to the measurement frames are matched within a difference in a preset allowable range, or in the case in which at least two of the different in-focus positions corresponding to the measurement frames are matched within a difference in a preset allowable range, the focus control part is configured to decide the matching point thereof as an in-focus position.

Furthermore, in the imaging apparatus according to an embodiment of the invention, the focus control part is configured to compare and check distance information to a face computed from the size of the face area detected from the face detecting part against a plurality of in-focus positions obtained from the measurement results to which a plurality of measurement frames is applied, and in the case in which there is a difference within a predetermined allowable range between the in-focus position determined from the distance information and any one of the plurality of the in-focus positions, the focus control part is configured to decide the in-focus position obtained from the measurement result to which the measurement frame is applied as a final in-focus position.

Furthermore, in the imaging apparatus according to an embodiment of the invention, the face detecting part is configured to continuously detect a face area from an input image in the imaging apparatus, a control part of the imaging apparatus is configured to store image information including at least any one of brightness and color information about the detected image in a memory in the case in which, a face area is successfully detected in the face detecting part, and in the case in which detection of a face area has failed, the control part is configured to check whether the imaging apparatus is moved, based on a comparison and check of image information including at least any one of brightness and color information between an image that face detection has failed and an image that face detection has been successful in the past, set a flag showing whether a position of a face area in the image that face detection has been successful in the past is applicable as a position of a face area in the image that face detection has failed, and record it on the memory, and the measurement frame setting part is configured to reference to the flag when face detection has failed, and in the case in which it is confirmed that a position of a face area in the image that face detection has been successful in the past is applicable, the measurement frame setting part is configured to perform a measurement frame setting process to which face area information about the image that face detection has been successful in the past is applied.

Furthermore, in the imaging apparatus according to an embodiment of the invention, in the case in which the face detecting part detects a plurality of face areas in an image inputted from the imaging apparatus, the measurement frame setting part is configured to in turn select a target person for setting a measurement frame in accordance with a preset priority.

Furthermore, an embodiment of the invention is a control method of an imaging apparatus which performs auto-focus control in the imaging apparatus, the method including the steps of: in a face detecting part, detecting a face area from an input image in the imaging apparatus; in a measurement frame setting part, setting a measurement frame corresponding to a face area that includes a face area and a measurement frame corresponding to a body area that includes a body area based on the face area detected in the face detecting part; and in a focus control part, applying each of the plurality of the measurement frames set in the measurement frame setting step to detect in-focus positions corresponding to the individual measurement frames based on a check of information about the detected in-focus positions corresponding to the individual measurement frames, and deciding a final in-focus position.

Furthermore, an embodiment of the invention is a computer program which allows auto-focus control in an imaging apparatus, the computer program including the steps of: in a face detecting part, detecting a face area from an input image in the imaging apparatus; in a measurement frame setting part, setting a measurement frame corresponding to a face area that includes a face area and a measurement frame corresponding to a body area that includes a body area based on the face area detected in the face detecting part; and in a focus control part, applying each of the plurality of the measurement frames set in the measurement frame setting step to detect in-focus positions corresponding to the individual measurement frames based on a check of information about the detected in-focus positions corresponding to the individual measurement frames, and deciding a final in-focus position.

Moreover, the computer program according to an embodiment of the invention is a computer program which can be provided in a computer readable format for a multi-purpose computer system that can execute various program codes, for example, in a recording medium such as CD, FD, or MO, or via a communication medium such as a network. Such a program is offered in the computer readable format, whereby processes can be implemented on the computer system in accordance with the program.

Other purposes, features and advantages according to an embodiment of the invention will be apparent from more detailed descriptions with reference to implementations of an embodiment of the invention and the accompanying drawings, described later. Moreover, a system in the specification is a logically assembled configuration formed of a plurality of devices, which is not limited to those having devices in an individual configuration inside the same housing.

In the configuration according to an embodiment of the invention, it is configured in which the face area is detected from the image data acquired in the imaging apparatus, the measurement frame corresponding to the face area that includes a face area and the body measurement frame corresponding to the body area other than the face area are set based on the detected face area, the plurality of the measurement frames is applied to compute the in-focus positions corresponding to the individual measurement frames, and data of the in-focus positions corresponding to the computed plurality of the measurement frames is used to decide the final in-focus position. Therefore, in-focus errors are prevented such as errors of setting the in-focus position based on background information and setting errors of the in-focus position based on low contrast, and an accurate in-focus position can be decided.

BRIEF DESCRIPTION OF THE DRAWINGS

FIG. 2 shows a diagram illustrative of an exemplary hardware configuration of the imaging apparatus according to an embodiment of the invention;

FIG. 3 shows a diagram illustrative of an exemplary lens drive and an exemplary AF evaluation value acquisition process done as focusing operations in focus control;

FIGS. 13A and 13B each show a diagram illustrative of the depth of view;

DETAILED DESCRIPTION OF THE INVENTION

Figure 1A:
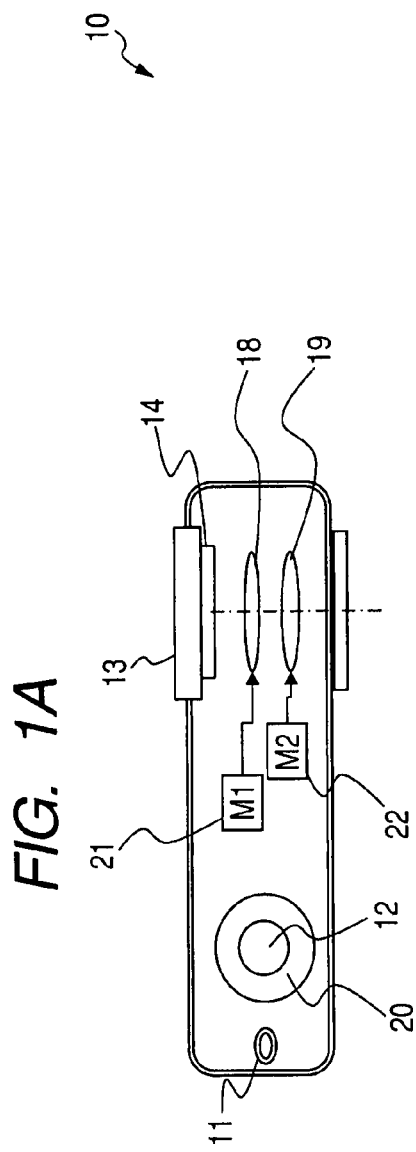
FIGS. 1A, 1B and 1C each show a diagram illustrative of an exemplary configuration of the appearance of an imaging apparatus according to an embodiment of the invention.
Figure 1C:
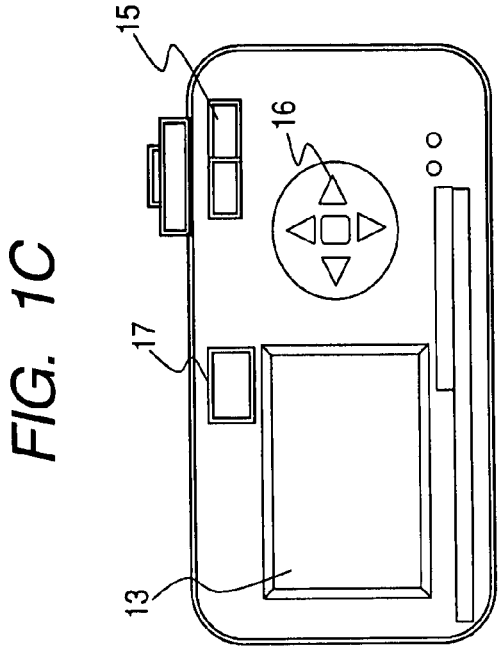
Figure 1B:
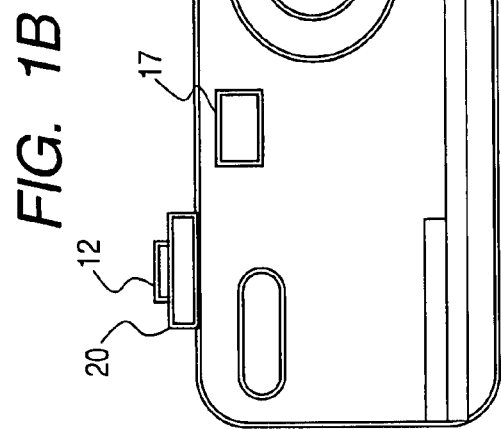

Hereinafter, the detail of an imaging apparatus, a control method of an imaging apparatus, and a computer program according to an embodiment of the invention will be described with reference to the drawings. An embodiment of the invention discloses a configuration which allows accurate auto-focusing (AF) for a target subject. The detail of an embodiment of the invention will be described in accordance with the items below.
1. The configuration of the imaging apparatus
2. The outline of focus control and face detection process
3. Focus control processes in which a measurement frame is set on a face and a body
4. The functional configuration of the imaging apparatus
1. The Configuration of an Imaging Apparatus First, the configuration of the imaging apparatus according to an embodiment of the invention will be described with reference to FIGS. 1A, 1B, 1C and FIG. 2. FIGS. 1A, 1B and 1C show diagrams depicting the appearance of an imaging apparatus 10 according to an embodiment of the invention. FIG. 1A shows a top view of the imaging apparatus 10, FIG. 1B is a front view, and FIG. 1C is a rear view. In the top view of FIG. 1A, a lens portion is shown as a cross section. The imaging apparatus 10 has a power switch 11, a trigger unit which sets a timing to capture an image, that is, a release switch 12 which functions as a shutter button, a monitor 13 which displays an image (through image) taken by the imaging apparatus and operation information, an imager 14 as an imaging device (CCD), a zoom button 15 for zooming control, a manipulation button 16 which enters information of various operations, an electronic viewfinder 17 which confirms an image (through image) taken by the imaging apparatus, a focus lens 18 which is driven in focus adjustment, a zoom lens 19 which is driven in zooming adjustment, a mode dial 20 which sets shooting modes, a focus lens motor (M1) 21 which drives the focus lens 18, and a zoom lens motor (M2) 22 which drives the zoom lens 19.

A subject image is displayed on the electronic viewfinder 17 and the monitor 13. The electronic viewfinder 17 and the monitor 13 are configured of an LCD, for example, on which the subject image is displayed as a moving image through the lens. The moving image is called a through picture. A user confirms to approve a target subject to shoot through the electronic viewfinder 17 or the monitor 13, and then presses the release switch 12 as a shutter button, whereby a recording process for an image is performed.

The internal configuration of the imaging apparatus 10 according to an embodiment of the invention will be described with reference to FIG. 2. The imaging apparatus according to an embodiment of the invention is an imaging apparatus having an auto focusing function. Incident light passes through a focus lens 101 and a zoom lens 102, enters an imaging device 103 such as a CCD (Charge Coupled Device), and is subjected to photo-electric conversion in the imaging device 103. The photo-electric conversion data is inputted in an analog signal processing part 104, subjected to noise filtering in the analog signal processing part 104, and converted into digital signals in an A/D converting part 105. The data digitally converted in the A/D converting part 105 is recorded on a recording device 115 configured of a flash memory, for example. In addition, it is displayed on a monitor 117 and an electronic viewfinder (EVF) 116. On the monitor 117 and the electronic viewfinder (EVF) 116, an image through the lens is displayed as a through picture regardless of whether it is shot or not.

A manipulating part 118 is a manipulating part including the release switch 12, the zoom button 15, the manipulation button 16 which enters information of various operations, the mode dial 20 which sets shooting modes, and so on in the camera main body described with reference to FIGS. 1A, 1B and 1C. A control part 110 has a CPU, which performs control for various processes done by the imaging apparatus in accordance with a program stored in advance in a memory (ROM) 120, for example. A memory (EEPROM) 119 is a non-volatile memory, in which image data, various items of sub-information, programs and so on are stored. A memory (ROM) 120 stores therein programs and computation parameters used by the control part (CPU) 110. A memory (RAM) 121 stores therein programs and parameters properly changing in execution used by the control part (CPU) 110. A gyro 111 detects the inclination and vibrations of the imaging apparatus, for example. Detected information is inputted into the control part (CPU) 110, to which a process to stabilize an image is applied, for example.

A motor driver 112 drives a focus lens drive motor 113 arranged as corresponding to the focus lens 101, and a zoom lens drive motor 114 arranged as corresponding to the zoom lens 102. A vertical driver 107 drives the imaging device (CCD) 103. A timing generator 106 generates control signals for timings of processes for the imaging device 103 and the analog signal processing part 104, and timings of processing the individual processing parts.

A face detecting part 130 analyzes image data inputted through the lens, and detects a person's face in the image data. Face detection information is sent to the control part 110, and the control part 110 sets a measurement frame (also referred to as a detection frame) for auto-focusing (AF) on the detected face area based on the detected face information for focus control. In the imaging apparatus according to an embodiment of the invention, a measurement frame is set on the detected face area as well as a body area of a person estimated from the face area is estimated and a measurement frame is also set on the body area, and focus control is performed based on the plurality of the measurement frames to determine a focus position.

2. The Outline of Focus Control and Face Detection Process

Next, the following processes which are applied in the imaging apparatus according to an embodiment of the invention will be described.
A. Focus control process based on contrast measurement
B. The face area detection process A. Focus Control Process Based on Contrast Measurement First, a focus control process based on contrast measurement which is applied in the imaging apparatus according to an embodiment of the invention will be described with reference to FIG. 3. The focus control based on contrast measurement is a scheme that determines whether the contrast of imaged data acquired through the lens is high or low to decide a focus position. For example, the auto-focusing (AF) is described in JP-A-10-213737.

Magnitude information about the contrast of an image acquired in a video camera or a still camera is used for focus control. For example, a particular area in a taken image is set as a signal acquisition area (spatial frequency extracting area) for focus control. The area is referred to as a measurement frame (a detection frame). This is a scheme in which a subject comes into focus more accurately as the contrast of the particular area is higher, it is determined that a subject is out of focus when the contrast is low, and the lens is driven to the position at which the contrast is made higher for adjustment.

More specifically, such a scheme is adapted in which a high frequency component in a particular area is extracted, integration data of the extracted high frequency component is generated, and it is determined whether the contrast is high or low based on the generated integration data of the high frequency component. In other words, a plurality of images is acquired while a focus lens is being moved to a plurality of positions, and a brightness signal of each image is filtered through a high pass filter, for example, whereby an AF evaluation value is obtained that indicates the intensity of the contrast of each image. At this time, in the case in which there is a subject that comes into focus at a certain focus position, the AF evaluation value for the focus lens position depicts a curve as shown in FIG. 3. A peak position P1 of the curve, that is, the position at which the contrast value of the image is the maximum is the in-focus position. In this scheme, the focusing operation can be operated based only on information of an image on an imager that is an imaging device of a digital camera, and any other distance measuring optical systems are unnecessary except an imaging optical system. On this account, the scheme is widely used on the digital still cameras nowadays.

In the imaging apparatus according to an embodiment of the invention, a measurement frame is set on the face area detected in the face detecting part 130 shown in FIG. 2, another measurement frame is set on a body area estimated from the face area, and the decision process of the focus position is performed for each of the plurality of the measurement frames based on contrast determination. This process configuration will be described in detail later.

B. Face Area Detection Process

Next, the face area detection process done by the face detecting part 130 of the imaging apparatus according to an embodiment of the invention will be described. For techniques of face recognition and tracking, various techniques are already disclosed, and the existing techniques can be applied. For example, as described in JP'-A-2004-133637, it is implemented that a matching is performed on a real image with a template on which face brightness distribution information is recorded. First, multiple types of images are prepared, in which real images are processed for scaling down. A group of templates of face brightness distribution information is prepared; the information is obtained when a face is tilted. Then, they are matched with each other one by one. This template is a template that is inclined to the individual X, Y, and Z-axes of a three dimensional orthogonal coordinate system of the face, and the inclination of an actual face is determined by matching with the template.

A matching is in turn performed to the scaled down image while the two dimensional plane is being shifted. When a certain area is matched with the template, the area is the position at which the face exists. In the imaging apparatus according to an embodiment of the invention, a single measurement frame is set on the face area, a body area is estimated based on the face area, and another measurement frame is set on the body area as well for auto-focusing based on contrast determination.

In addition, when the face area is determined from the template matching described above, the size of the face can also be determined from the scale down factor of the real image. In addition, a rotation angle, yaw, pitch, and roll angle about the three orthogonal axes can be determined from the template used at that time. The size of a face, the position, and the rotation angle thus determined are used to estimate the distance to the face for auto focusing control, whereby the operating range of the focus lens (Rf) can be set smaller.

Figure 4:
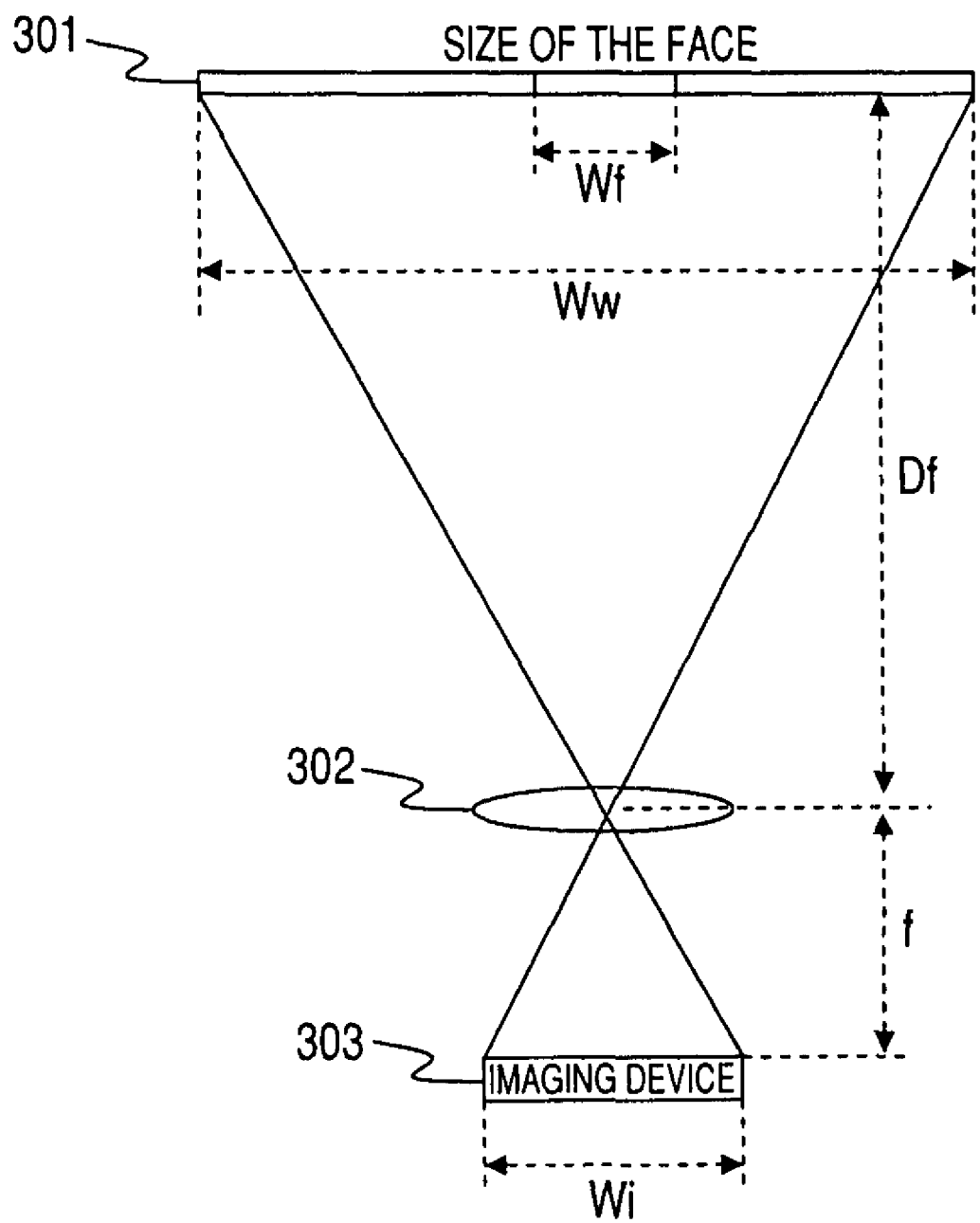
FIG. 4 shows a diagram illustrative of a subject distance computation process based on the size of a face.

A specific scheme of computing a distance to a face will be described with reference to FIG. 4. FIG. 4 shows a subject position 301, a focus lens 302, and an imaging device 303. At the subject position 301, a person's face exists. The size of a face (the width of a face) is Wf.

When the actual size (Wf) of the face is found, the distance to the face, that is, the subject distance (Df)) can be determined from the basic physical law of the lens. In other words, the subject distance (Df) from the focus lens 302 to the subject position 301 can be determined by the following equation.

$$Df = Wref(f/Wi)(Ww/Wf) \quad \text{(Equation 1.1)}$$

The following is the description of signs in the equation above.

Human face size reference value: Wref
Width of the imaging device: Wi
Focal length: f
The number of pixels of the human face size in the taken image (the value detected by the imaging device): Wf
The number of pixels of the size of the image for use in human face detection (the value detected by the imaging device): Ww For the human face size reference value (Wref), a predetermined fixed value can be used. Moreover, the face size reference value (Wref) can be set to the value in consideration of the differences in individuals, races, ages, gender, and so on for processing. With this process, more accurate distance estimation can be implemented.

3. Focus Control Processes in which a Measurement Frame is Set on a Face and a Body Next, focus control processes in which a measurement frame is set on a face and a body will be described, the processes are done by the imaging apparatus according to an embodiment of the invention.

One feature of the imaging apparatus according to an embodiment of the invention is that a face is detected from an image (a through image) acquired in the imaging apparatus, a measurement frame is set on the face area, a body area is estimated from the face area, a measurement frame is also set on the body area, and the measurement frames are applied to decide a focus position based on contrast determination.

Figure 5A:
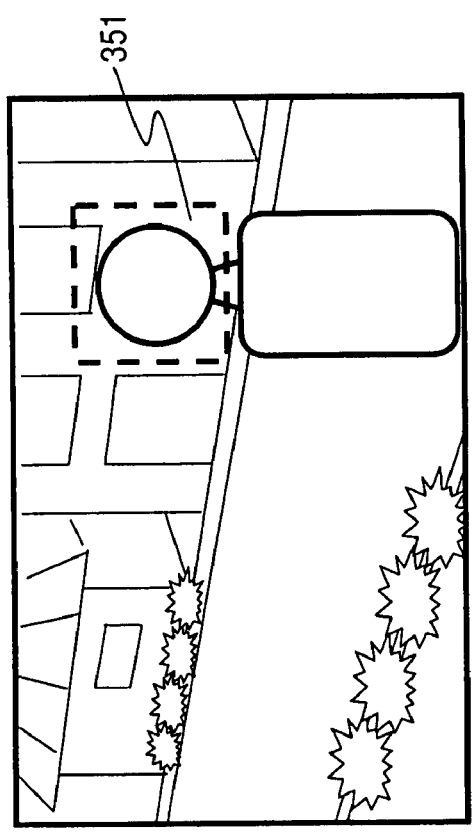
FIGS. 5A and 5B each show a diagram illustrative of exemplary settings of measurement frames for focus control.
Figure 5B:
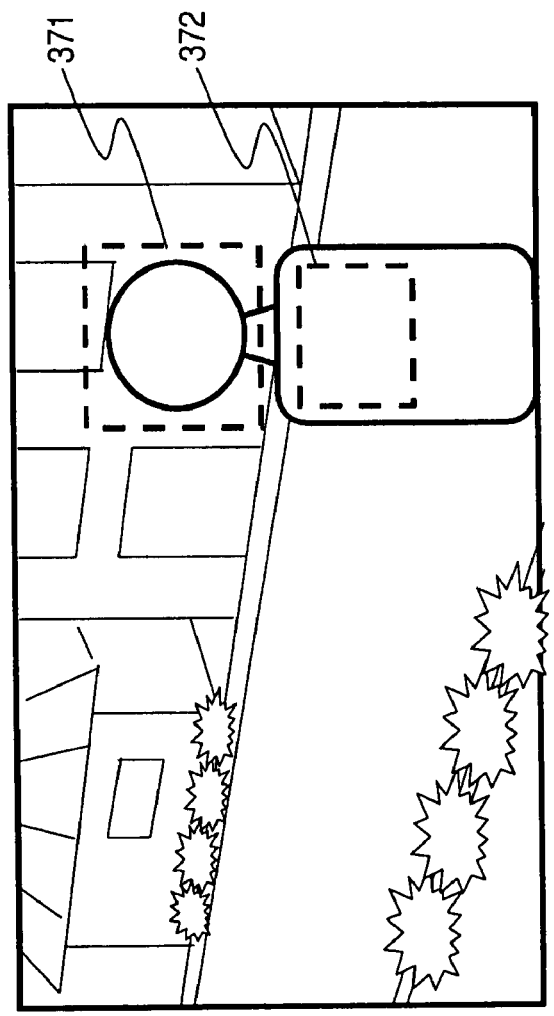

The configuration of setting the measurement frame will be described with reference to FIGS. 5A and 5B. Images shown in FIGS. 5A and 5B show images (through images) continuously acquired in the imaging apparatus, and FIG. 5A shows an example where a measurement frame is set only on a face area. In other words, it is the example that a measurement frame 351 for measuring a focus position is set on the detected face area in the face detecting part. As described above, the configuration of setting a measurement frame on a face area exists before.

As described above, in the case in which the measurement frame 351 is set on the entire face area, it is highly likely that the background is included in the measurement frame 351. In this case, the problem "background in focus" arises in that a person is not brought into focus but the background is brought into focus. In other words, a process is performed in which contrast changes due to driving a lens inside the measurement frame 351 are measured to decide a focus position. However, since the contrast of the face tends to have a lower brightness contrast than the other subjects have (the background), distance measurement information about the face is buried in other information. In other words, a large measurement frame causes failed auto-focusing.

In order to prevent the problem "background in focus" like this, it can be thought that a measurement frame is set inside a face. However, in the case in which a measurement frame is set inside the detected face as described above, the changes in the contrast can be measured when a measurement frame including characteristic points such as a mouth and eyes. However, in the case in which a measurement frame not including these characteristic points is set, the contrast is low, it tends to be difficult to show changes in the contrast due to driving a lens, causing a phenomenon that a subject is not brought into focus. Moreover, in the case in which a measurement frame is small, it is likely to determine a wrong focus position because of an unstable camera and an unstable subject. Therefore, there is a problem that a too small measurement frame causes failed auto-focusing.

These problems are the problem that occurs because a measurement frame is set only on the detected face area for focus position search based on the changes in the contrast. One scheme that solves this problem, is a scheme where a measurement frame is set on a plurality of places, not a single measurement frame, and the measured result based on a plurality of the measurement frames is comprehensively determined to detect a position at which a subject is best brought into focus.

However, for example, in the case in which a plurality of measurement frames is set in the internal area of a plurality of different faces for focus position search, the following problem occurs.

Auto-focusing performance aiming inside the face highly depends on the detection accuracy of a face and the accuracy of face part recognition.

There are a small number of parts that can be aimed inside the face and if focusing is missed, a low contrast part such as cheeks comes into focus.

Because of these problems, even though a plurality of the measurement frames including the parts inside the face is set, it is judged that it is unlikely to obtain good results.

Then, in the imaging apparatus according to an embodiment of the invention, a target on which a measurement frame is placed is set to a face area, and to an area other than the face. For example, a measurement frame is set on a body other than a person's face, and a focus position is decided from contrast measurement based on these measurement frames. This is because a person's clothes usually have patterns different from the skin tone of a face, and the changes in the contrast are usually easily detected. In this way, it is thought that a focus position can be detected more accurately.

For example, as shown in FIG. 5B, in addition to a measurement frame 371 for a face area, a measurement frame 372 is set on a body area. The changes in the contrast corresponding to driving the lens position described above with reference to FIG. 3 are detected in each of the measurement frames, and a focus position is decided based on the result of contrast.

Figure 6:
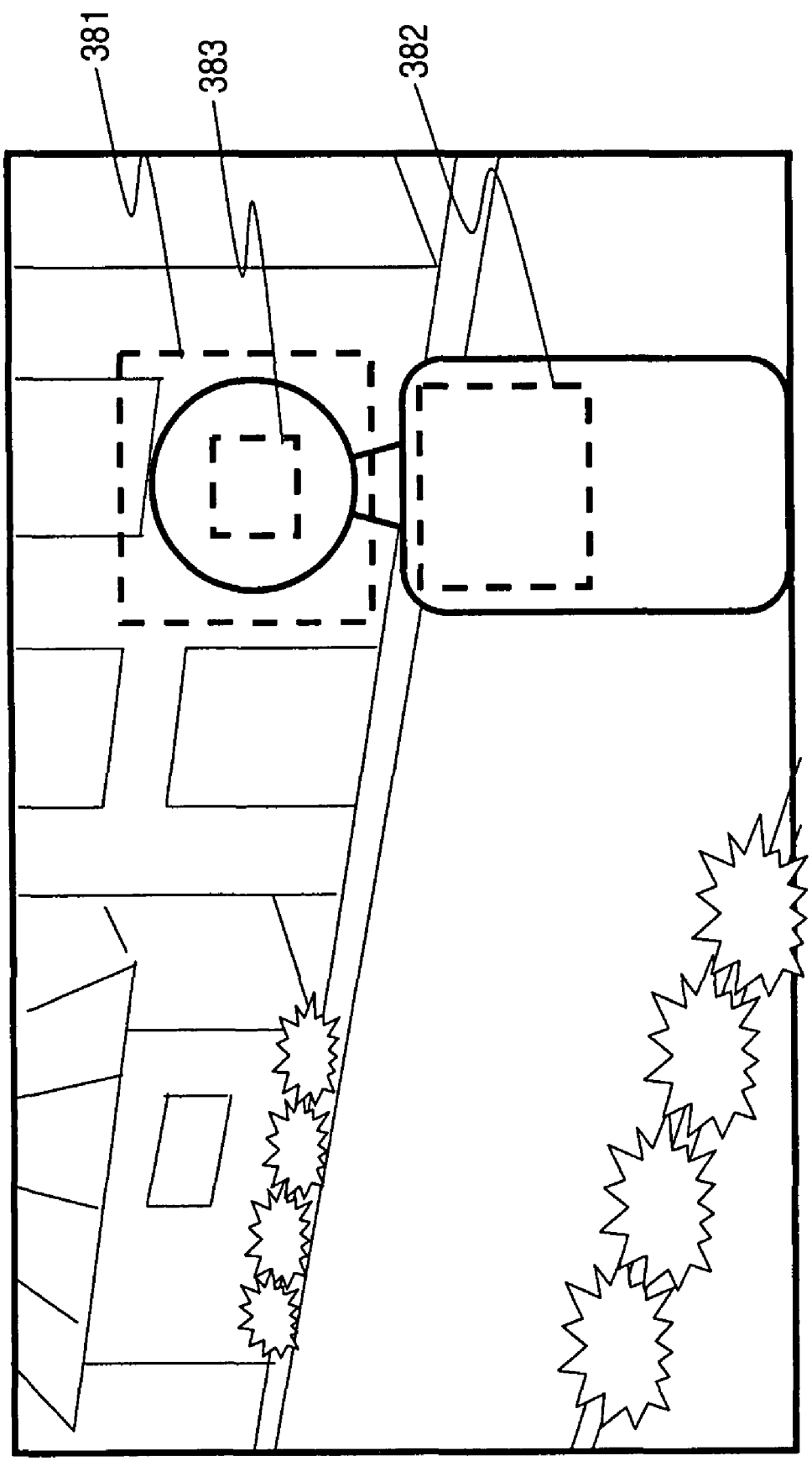
FIG. 6 shows a diagram illustrative of exemplary settings of measurement frames for focus control.

In addition, for example, as shown in FIG. 6, a plurality of measurement frames below is set:
(a) a measurement frame 381 for a face area,
(b) a measurement frame 382 for a body area, and
(c) a measurement frame 383 for an in-face area.

It may be configured in which in the measurement frames 381 to 383, first, the changes in the contrast corresponding to driving the lens position described with reference to FIG. 3 are detected in each of the measurement frames, and a focus position is decided based on the result of contrast.

Figure 7:
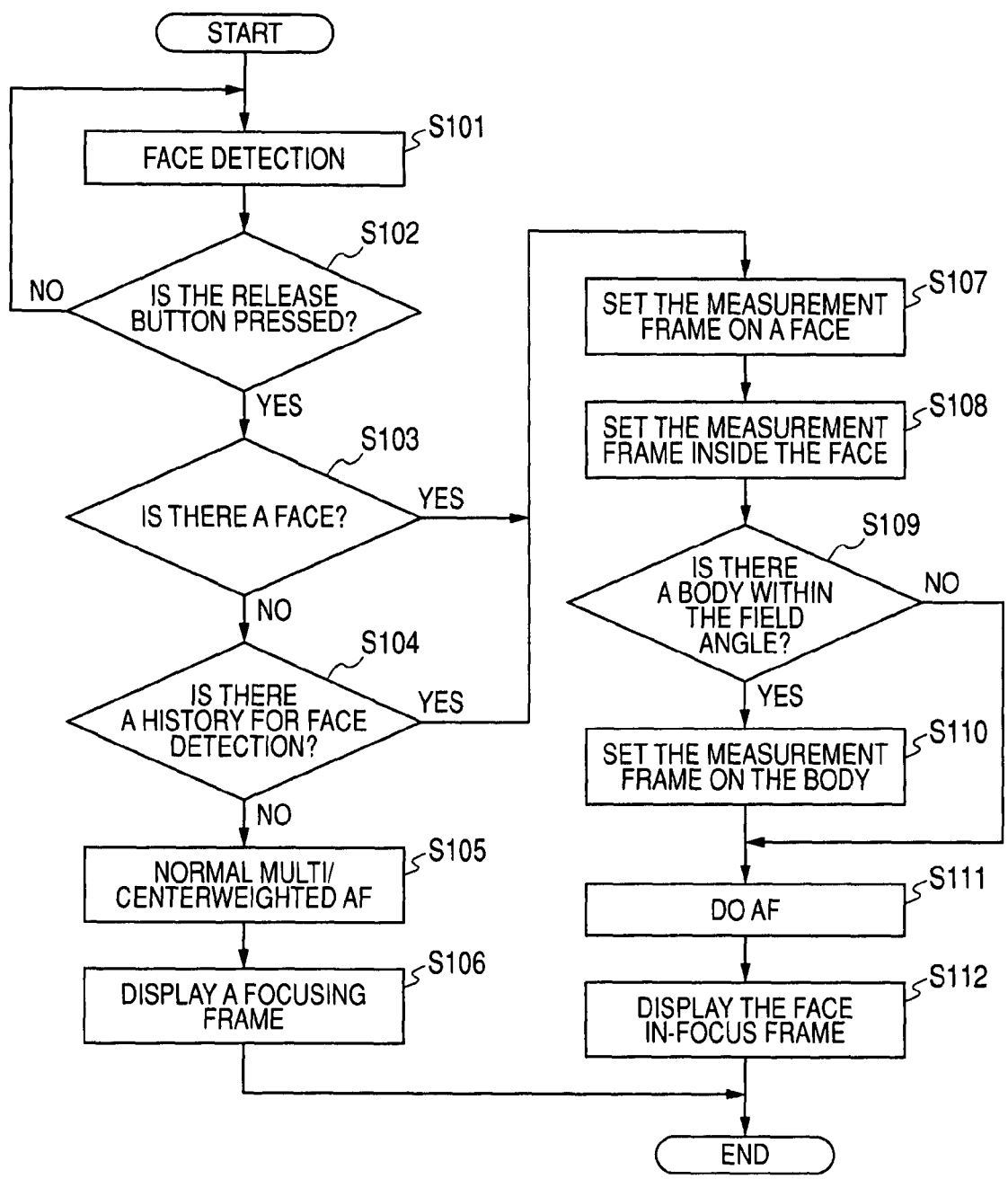
FIG. 7 shows a flow chart illustrative of setting of measurement frames and the sequence of auto-focus control.

The detail of the auto-focus control process in which the measurement frames are set on three places as shown in FIG. 6 will be described with reference to FIG. 7 and the other drawings. FIG. 7 shows a flowchart illustrative of the operation sequence of the imaging apparatus when the auto-focus control process is performed in which the measurement frames are set on three places as shown in FIG. 6.

In Step S101, the face detection process is performed. This process is performed as the process done by the face detecting part 130 shown in FIG. 2, which is performed by using the scheme of template matching as described above. The settings of the measurement frame are made if it is detected that the release button is pressed (pressed halfway) (Yes in Step S102). Until the release button is pressed, the face detection in Step S101 is repeatedly performed while waiting. The face detection is continuously performed to remove the necessity to start face detection after the release button is pressed, and the processing time can be shortened. In other words, a time lag of the release button can be shortened. In addition, it may be configured in which the face detection is performed after the release button is pressed. Also in this case, the auto-focusing performance other than the time lag of the release button is unchanged.

After it is confirmed in Step S102 that the release button is pressed, it is determined whether a face is detected in Step S103. If a face is detected, the process goes to Step S107, a measurement frame is set on the detected face, and a measurement frame is set inside the face in Step S108.

Furthermore, in Step S109, if it is determined whether there is a body within the field angle of the image acquired in the imaging apparatus and it is determined that there is a body, the process goes to Step S110, and a measurement frame is set on the body. The determination process whether there is a body in Step S109 and the scheme of setting the measurement frame on a body in Step S110 will be described later in detail.

In Step S111, the auto-focusing (AF) process that applies the set measurement frame is performed. In other words, as described above with reference to FIG. 3, the changes in the contrast due to driving the lens are detected, and then a focus position (in-focus position) is decided. First, the individual in-focus positions are decided for each of a plurality of the measurement frames, and after that, the final in-focus position is decided based on the plurality of the in-focus positions. The specific sequence of this process will be described later.

After the auto-focusing process in Step S111 is completed, in Step S112, an in-focus frame that indicates the end of auto-focus control is displayed on the monitor or the viewfinder of the imaging apparatus.

In addition, in Step S103, if it is determined that no face is detected, the process goes to Step S104, and face detection history information in the past is referenced. If face detection information remains in a past frame, a face detection area corresponding to the past frame is used to set individual measurement frames in Step S107 and the subsequent steps.

In the imaging apparatus according to an embodiment of the invention, it is configured in which the face detection process is continuously performed for the images successively acquired and face detection information corresponding to the frame in a preset period is held. Even though face detection has failed at the timing about to set a measurement frame, it is determined whether there is detection information right before, and if there is face detection information, a measurement frame is set based on that detection information. For example, in the case in which no face is detected because of such a factor that the orientation of the face is changed, it is determined that the face is still there, and the result having been detected at the previous time is used to set a measurement frame.

In Step S104, if it is determined that there is no history of detecting a face, the usual scheme is applied in Step S105 in which focus control is performed in accordance with "Multi AF" or "multipoint range AF", or by setting a measuring area at the center of the screen. In Step S106, an in-focus frame that indicates the end of focus control is displayed on the monitor or the viewfinder of the imaging apparatus.

In the imaging apparatus according to an embodiment of the invention, it is configured so that if no face is detected in Step S103, it is determined whether there is a face detection history in Step S104, and if there is a history, information about the history is applied to set a measurement frame. Therefore, in order to allow the determination of the existence of the face detection history, it is configured in which in performing the face detection process, a face detection history flag is set. The sequence of setting the face detection history flag will be described with reference to a flowchart shown in FIG. 8.

Figure 8:
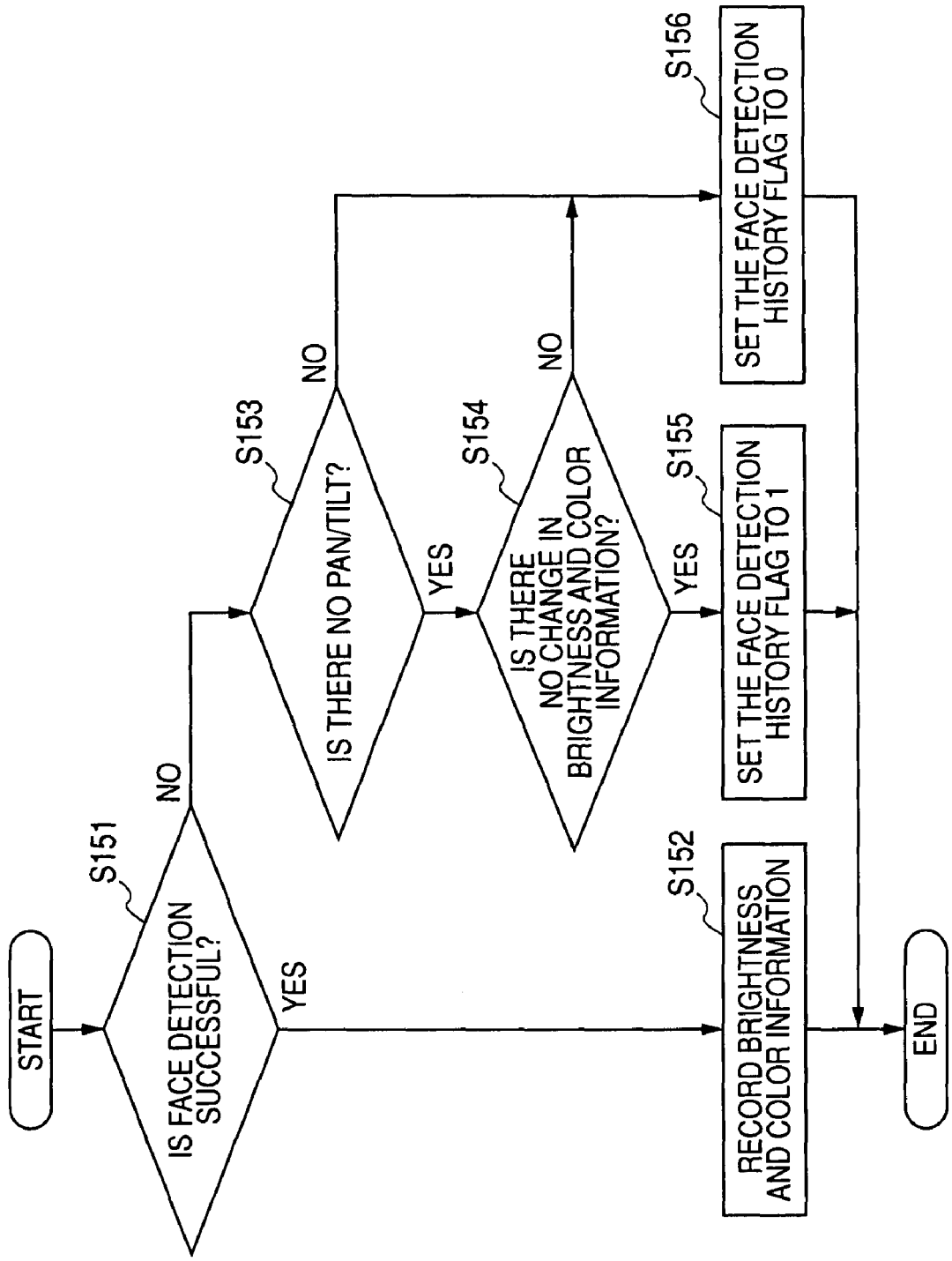
FIG. 8 shows a flow chart illustrative of the sequence of setting a face detection history flag.

The flow chart shown in FIG. 8 is performed by using face detection information of the face detecting part under control done by the control part. For example, the face detection process done by the face detecting part is continuously, repeatedly performed for predetermined frame intervals, and the process shown in FIG. 8 is also repeatedly performed at the timings of each detection process step.

First, in Step S151, if a face is successfully detected in the face detecting part, the process goes to Step S152, and brightness and color information of image data included at least in the detected face area are recorded in the memory. In Step S151, if face detection is unsuccessful in the face detecting part, the process goes to Step S153, and it is determined whether pan or tilt has been done from the time of successful face detection in the past to now. For example, it is detected whether the imaging apparatus makes pan or tilt through the analysis of changes in the acquired image or by means of the gyro 111 shown in FIG. 2.

If pan or tilt has not been made, the process goes to Step S154, the brightness and color information at least in the detected face area that are recorded in the memory corresponding to the image at the time of successful face detection in the past are compared with the brightness and color information in the area corresponding to the latest image of failed face detection. If there is no difference in brightness and color information between the images, it is determined that there is no great difference between the image of the frame that face detection has been successful and the image of the latest frame that face detection has failed. In Step S155, a flag indicating that the image of the frame that face detection has been successful in the past can be applied to estimate the face area, that is, the face detection history flag is set to 1 as a history flag that corresponds to the image of the latest frame.

If the face detection history flag is 1, it indicates such estimation can be made that a face area exists at the same position as that of the image of the frame that face detection has been successful in the past. On the other hand, if it is determined in Step S153 that pan or tilt has been made from the time of successful face detection in the past to now, or if it is confirmed in Step S154 that there is a difference between the brightness and color information in the face area recorded in the memory corresponding to the image of the frame that face detection has been successful in the past and the brightness and color information in the area corresponding to the latest image that face detection has failed, it is highly likely that the image of the frame that face detection has failed is different from the image of the frame that face detection has been successful in the past, it is determined that it is difficult to estimate the position corresponding to the face area of the image of the frame in the past as the face area of the current frame, and the process goes to Step S156. A flag indicating that the face area position information of the frame that face detection has been successful in the past, that is, the face detection history flag is set to 0 as a history flag that corresponds to the image of the latest frame.

If the face detection history flag is set to 1, it is determined in Step S104 shown in FIG. 7 that there is a face detection history, and it is estimated that the face exists in the detected face area in the frame that face detection has been successful in the past. The process goes to Step S107, the individual measurement frames are set based on the estimated face area.

On the other hand, if the face detection history flag is set to 0, it is determined that it is difficult to apply information about the frame that face detection has been successful in the past, and the process goes to Step S105, without performing the measurement frame setting process after Step S107. The usual scheme is applied in Step S105 in which focus control is performed in accordance with "Multi AF" or "multipoint range AF", or by setting a measuring area at the center of the screen.

As described above, in the imaging apparatus according to an embodiment of the invention, if changes in brightness and color information of the images are observed to whether a camera pans or tilts to change the shooting scene and then it is determined that there is no difference from the image that face detection has been successful in the past, it is estimated that the face still currently exists in the detected face area in the past frame, and a measurement frame is set on the face area and the other areas. With this configuration, processing can be stably done even though detection errors occur in the face detecting part. More specifically, even in the case in which a face is not temporarily detected, caused by such a factor that the orientation of the face is changed, it is determined whether detection information in the past is reliable, and then the process can be performed.

Figure 9:
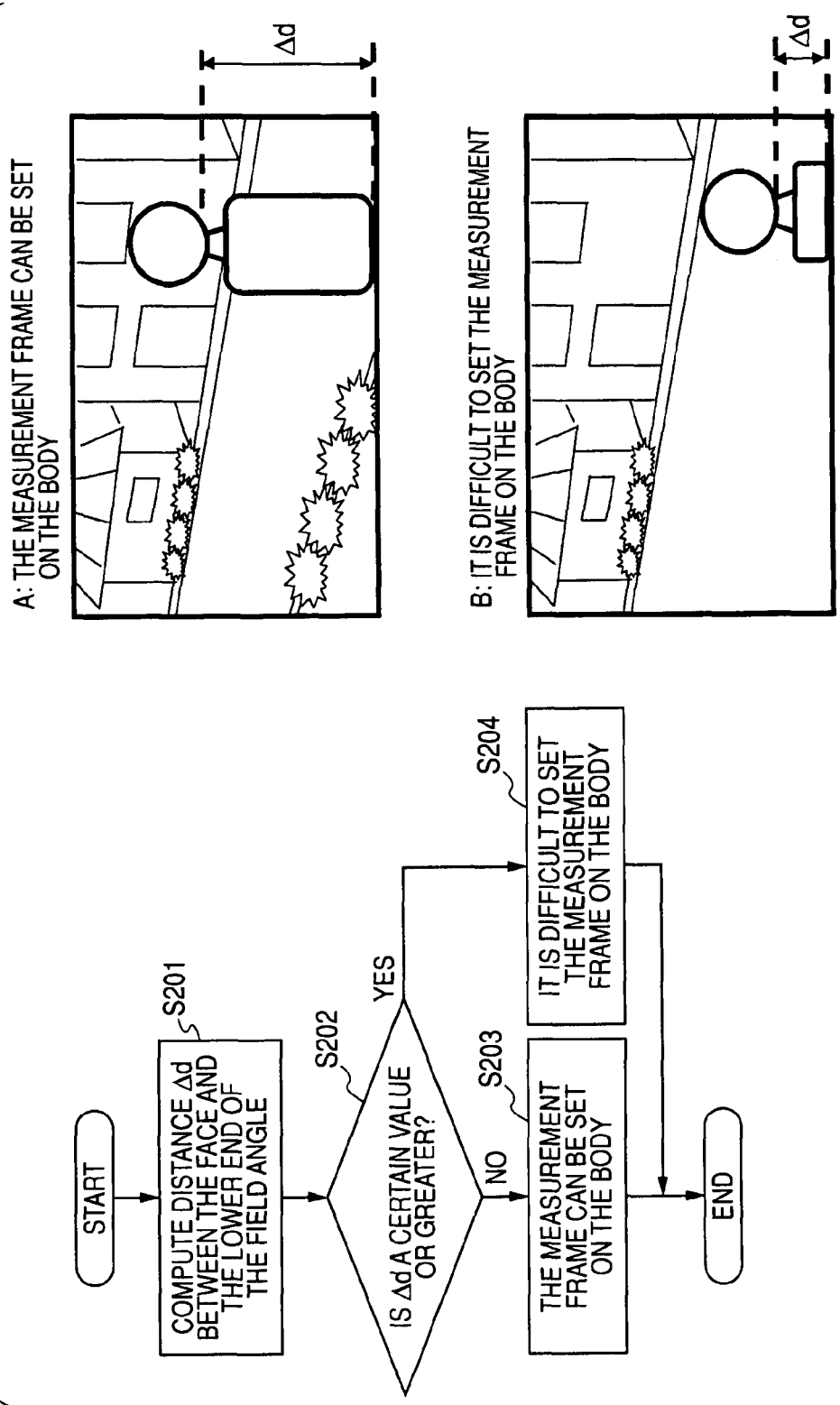
FIGS. 9A and 9B show a flow chart and diagrams illustrative of a measurement frame setting determination process and a process sequence conforming to a body area.

Next, the process in Step S109 in the flow chart shown in FIG. 7, that is, a specific exemplary process that determines whether the body area included in the image acquired in the imaging apparatus has the size that allows setting of the measurement frame will be described with reference to FIGS. 9A and 9B.

Even though the face area is determined from the image acquired in the imaging apparatus, the body area sufficient to set a measurement frame is not always included in the image. For example, as shown in FIG. 9A, in the case in which a large body area exists in an image, the measurement frame corresponding to the body area can be set, whereas as shown in FIG. 9B, in the case in which the body area in the image is small, it is difficult to set the measurement frame corresponding to the body area. The measurement frame is set as the area that detects the changes in the contrast corresponding to the movement of the lens, which demands a certain size. The determination process of the size is performed in Step S109 shown in FIG. 7. The detailed sequence of Step S109 will be described with reference to a flow chart shown in FIGS. 9A and 9B.

In Step S201, a distance Δd between the face and the lower end of the field angle is computed. It is the distance Δd shown in FIGS. 9A and 9B. Subsequently, in Step S202, Δd is compared with a preset threshold. A specific exemplary process will be described.

Suppose the vertical length of the detected face is fxv, and the distance between the lower end of the face and the lower end of the field angle is Δd.

At this time, it is determined whether the following equation is satisfied.

$$fxv \times k < \Delta d$$

(where, k=about 0.5 to 1.0).

If the equation is satisfied, the process goes to Step S203, and then it is determined that the measurement frame corresponding to the body area can be set. If the equation is not satisfied, the process goes to Step S204, and then it is determined that it is difficult to set the measurement frame corresponding to the body area.

The process goes to Step S203, and if it is determined that the measurement frame corresponding to the body area can be set, which is equivalent to that, it is determined as positive in Step S109 in FIG. 7. In Step S110, the measurement frame corresponding to the body is set, and in Step S111, the distance measurement process is performed based on three measurement frames on the face area, the in-face area, and the body area to decide a focus position. On the other hand, the process goes to Step S204, and if it is determined that it is difficult to set the measurement frame corresponding to the body area, which is equivalent to that, it is determined as negative in Step S109 in FIG. 7. The setting of the measurement frame corresponding to the body in Step S110 is omitted, and the process goes to Step S111. The distance measurement process is performed based on two measurement frames on the face area and the in-face area to decide a focus position.

Figure 10:
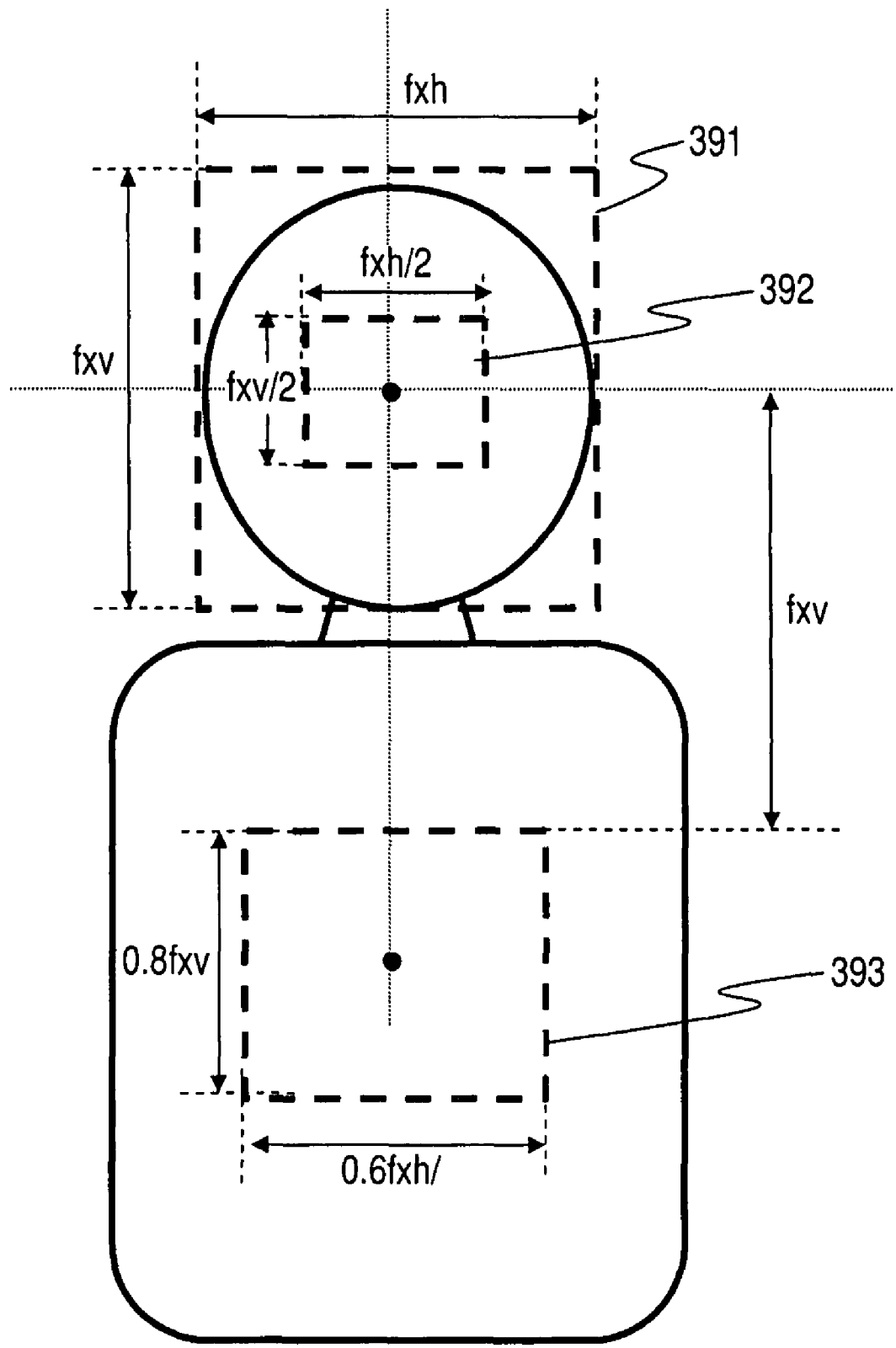
FIG. 10 shows a diagram illustrative of an exemplary measurement frame setting process conforming to individual areas.

Next, the measurement frame setting process in the flow chart shown in FIG. 7, that is, the detail of the following measurement frame setting process will be described with reference to FIG. 10.

The setting of the measurement frame corresponding to the face area in Step S107, The setting of the measurement frame corresponding to the in-face area in Step S108.

The setting of the measurement frame corresponding to the body area in Step S110.

The setting of the measurement frame corresponding to the face area in Step S107 is performed as below.

A rectangular area of fxv×fxh is set as a rectangular area inscribed in the face area, and the rectangular area is the measurement frame corresponding to the face area, where the vertical length of the face is fxv, and the breadth of the face is fxh. It is a measurement frame 391 corresponding to the face area shown in FIG. 10.

The setting of the measurement frame corresponding to the in-face area in Step S108 is performed as below.

The vertical length=0.5×fxv, the breadth of =0.5×fxh, the center coordinates=the center coordinates of the measuring area of the entire face, and the rectangular area is the measurement frame corresponding to the in-face area, where the vertical length of the face is fxv, and the breadth of the face is fxh. It is a measurement frame 392 corresponding to the in-face area shown in FIG. 10.

The measurement frame corresponding to the internal body area in Step S110 is performed as below.

The vertical length=0.8×fxv, the breadth of =0.6×fxh, the center coordinates in the vertical direction with respect to the body=the center coordinates of the measuring area of the entire face (the vertical direction)+(the vertical length of the measuring area the body/2)+fxv, the center coordinates in the horizontal direction with respect to the body=the center coordinates of the entire face (the horizontal direction), and the rectangular area is the measurement frame corresponding to the body area, where the vertical length of the face is fxv, and the breadth of the face is fxh. It is the measurement frame 393 corresponding to the body area shown in FIG. 10.

In Step S111 in the flowchart shown FIG. 7, the distance measurement process which applies the measurement frames, that is, the changes in the contrast corresponding to the movement of the lens are detected to decide a focus position. However, the measurement results of all the measurement frames, that is, the changes in the contrast information are not always effectively usable. For example, in the case in which brightness is not enough, it is sometimes difficult to use data of the measurement result. In other words, it is determined whether data of measuring a distance is usable for every measurement frame set on the entire face, inside the face, and the body. The determination sequence will be described with reference to a flow chart shown in FIG. 11. The evaluation point is whether the contrast signal of brightness is sufficiently changed. In the case in which the contrast of brightness is not sufficiently obtained, it is called low contrast, in which since a clear maximum point of brightness contrast does not exist, it is very difficult to know the position at which focus is achieved.

Figure 11:
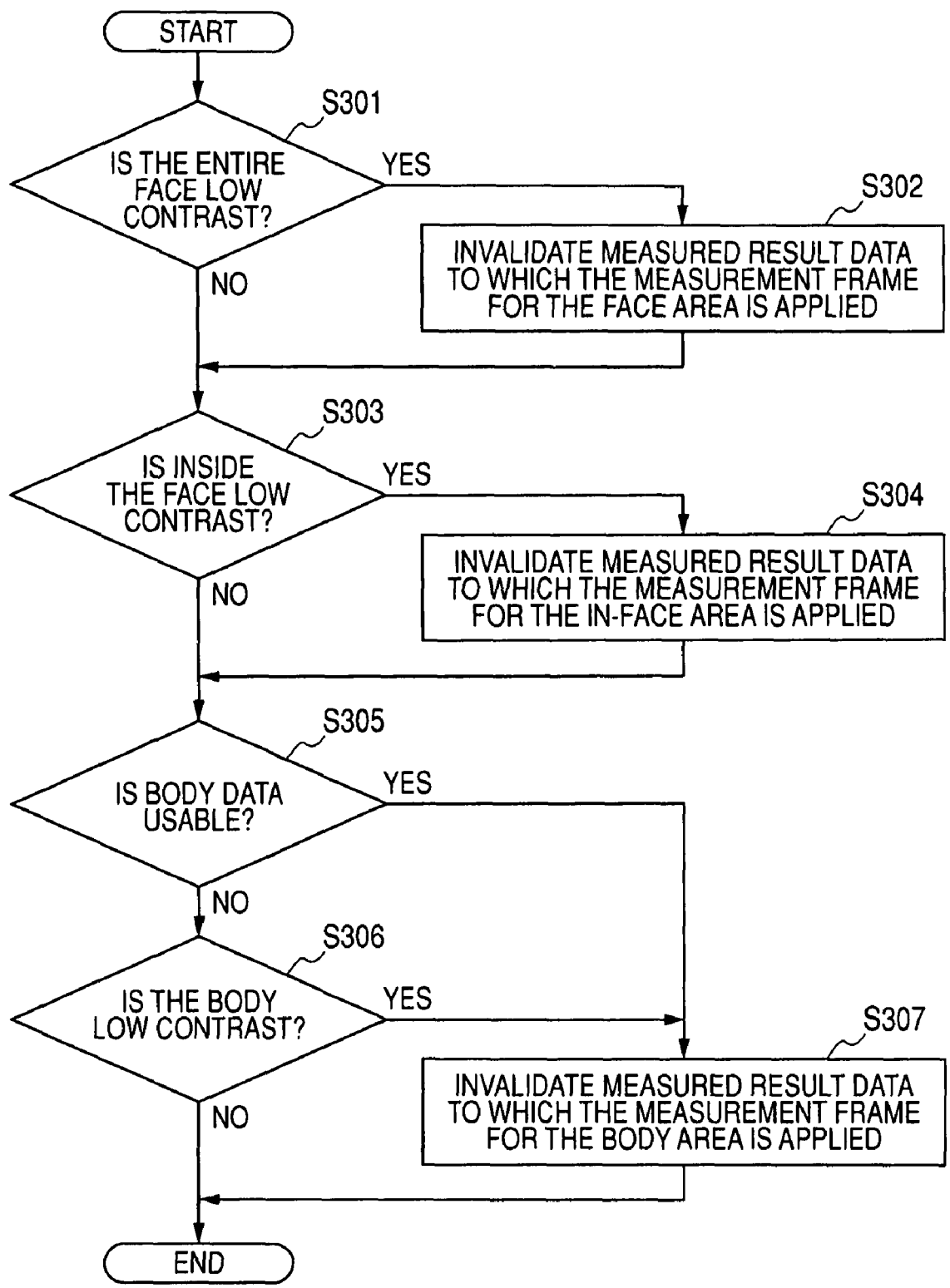
FIG. 11 shows a flow chart illustrative of the sequence of an effectiveness determination process for measurement result data of the individual measurement frames.

The flowchart shown in FIG. 11 partially configures the AF (auto-focusing) process in Step S111 in the flowchart shown in FIG. 7. In other words, the process is performed as the process that determines the effectiveness of data of measuring a distance performed by applying the individual measurement frames. First, in Step S301, it is determined whether data of measuring a distance obtained by applying the measurement frame corresponding to the face area is effective. More specifically, it is determined whether data inside the measurement frame corresponding to the face area is low contrast. If it is determined that the contrast is low, the process goes to Step S302. It is determined that data of the measurement result obtained by applying the measurement frame corresponding to the face area should not be used, and data is invalidated.

Subsequently, in Step S303, it is determined whether data of measuring a distance obtained by applying the measurement frame corresponding to the in-face area is effective. More specifically, it is determined whether data inside the measurement frame corresponding to the in-face area is low contrast. If it is determined that the contrast is low, the process goes to Step S304. It is determined that data of the measurement result obtained by applying the measurement frame corresponding to the in-face area should not be used, and data is invalidated.

Subsequently, in Step S305, it is determined whether the measurement frame corresponding to the body area has been set. If it has been set, the process goes to Step S306, and it is determined whether data of measuring a distance the measurement frame corresponding to the body area obtained by applying is effective. More specifically, it is determined whether the measurement frame corresponding to the body area data inside is low contrast.

In Step S305, if the measurement frame corresponding to the body area is not set, or in Step S306, if it is determined that the contrast is low, the process goes to Step S307. It is determined that the measurement frame corresponding to the body area obtained by applying data of the measurement result should not be used, and data is invalidated.

Figure 12:
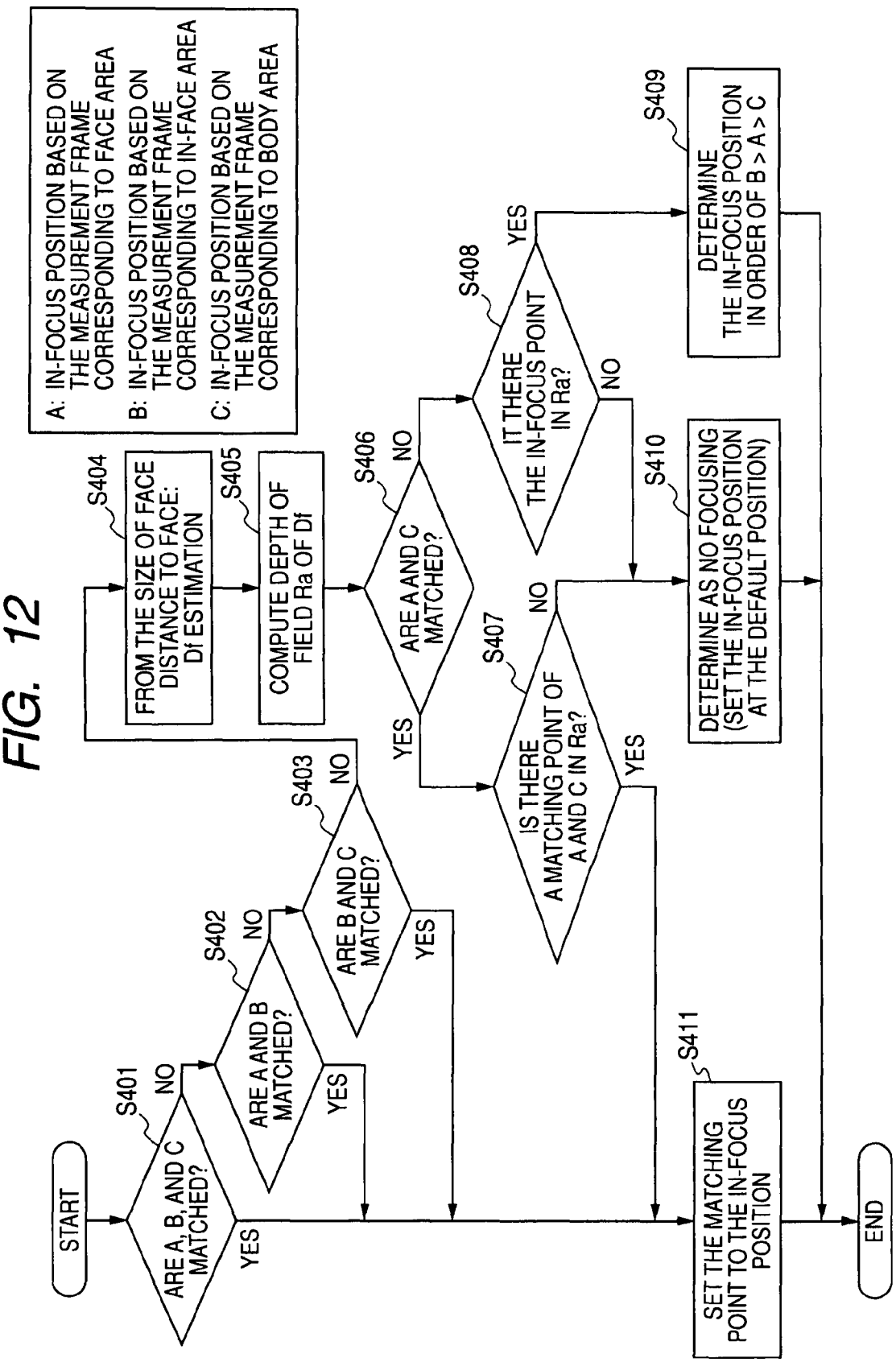
FIG. 12 shows a flow chart illustrative of the sequence of an in-focus position decision process using data of the measurement result using the individual measurement frames.

Next, a specific sequence of deciding the focus position (the in-focus position) will be described with reference to a flow chart shown in FIG. 12. The flow chart shown in FIG. 12 is the detailed process of the auto-focusing process in Step S111 in the flow chart shown in FIG. 7. In addition, the process flow chart shown in FIG. 12 is exemplary process steps when the following measurement results are all validated.

the measurement result based on the measurement frame corresponding to the face area, the measurement result based on the measurement frame corresponding to the in-face area, and the measurement result based on the measurement frame corresponding to the body area.

The process sequence is described as below:

A: the in-focus position obtained from the measurement result based on the measurement frame corresponding to the face area, B: the in-focus position obtained from the measurement result based on the measurement frame corresponding to the in-face area, and C: the in-focus position obtained from the measurement result based on the measurement frame corresponding to the body area.

In the case in which it is difficult to use any one of the measurement results, the process steps are performed as any one of A, B and C is omitted.

Although the discussion is repeated, in the case in which the entire face corresponding to the face area is the target for measuring a distance, there is a risk that the background is brought into focus. In the case in which the distance to the inside of the face is measured, there is a risk that the contrast is low, or the measurement result appears at a wrong position due to the influence of an unstable camera and an unstable subject. Moreover, in the case in which the measurement frame for the body is used, there is a risk that the contrast is low depending on the clothes, or the background is brought into focus. However, generally, the clothes usually have higher contrast than the face has, and the background tends not to come into focus. In addition, in the final in-focus position decision process, since the measuring area determined as low contrast results in insufficient reliability, the area is removed of the target for evaluation.

The individual process steps of the flow chart shown in FIG. 12 will be described. First, in Step S401, it is determined whether the in-focus positions are all matched that are based on the contrast measurements to which the measurement frames corresponding to the face area, the in-face area, and the body area are applied.

If A, B and C are matched, since the in-focus position based on the measurement frame corresponding to the in-face area is matched with the in-focus position based on the measurement frame corresponding to the face area for the entire face, it shows that errors caused by the background in focus do not occur at the in-focus position based on the measurement frame corresponding to the face area. In addition, since the in-focus position measured based on the measurement frame corresponding to the body area is matched with the in-focus position measured based on the measurement frame corresponding to the in-face area, it can be determined that the reliability of the in-focus position measured based on the measurement frame corresponding to the in-face area is high, that is, the in-focus position is hardly affected by the influence of an unstable camera or an unstable subject. In other words, the reliability of the measurement result is significantly high. Here, the term "matched" is that the difference is within a fixed range; the minimum is 0, and the maximum is within the depth of view. In other words, in Step S401, it is determined whether the following is held:

A is nearly equal to B, and B is nearly equal to C.

If the above is held, the process goes to Step S411, and the matching point is the in-focus position.

In addition, the term "depth of view" is information that defines the range not generating blurring when a picture is taken. The depth of view will be described with reference to FIGS. 13A and 13B. As shown in FIG. 13A, the image of a subject 501 is formed on an imager 504 through an iris 502 and a lens 503. At this time, when the range that the blurring of the image is not recognized is set as an allowable circle of confusion 505, the allowable error of the distance to the subject can be computed as the depth of view Ra based on the allowable circle of confusion.

The depth of view Ra, that is, the forward depth of view (Ran) to the backward depth of view (Raf) is defined by the following equation:

$$Ra=(Df^2 \times d \times f)/(f^2+Df \times d \times F) \text{ to } (Df^2 \times d \times f)/(f^2-Df \times d \times F),$$

where:
the subject position is Df,
the allowable circle of confusion is d,
the F value (aperture) is F, and
the lens focal length is f.

In Step S401, it is determined that a matching is made in the case in which the in-focus positions A, B and C include the error in the depth of view. In other words, it is determined whether the following is held:
A is nearly equal to B, and B is nearly equal to C.

In Step S401, if it is determined that the following is not held, the process goes to Step S402.
A is nearly equal to B, and B is nearly equal to C.

Then, it is determined whether two in-focus positions are matched:
A: the in-focus position obtained from the measurement result based on the measurement frame corresponding to the face area, and
B: the in-focus position obtained from the measurement result based on the measurement frame corresponding to the in-face area.

In other words, it is determined whether the following is held:
A is nearly equal to B.

If the above is held, the process goes to Step S411, and the matching point is the in-focus position.

This case is the case in which A is matched with B, whereas C is not matched. These cases correspond to the case, in which a body is at an unmeasurable position, another subject is in front of a body, or the clothes are low contrast. However, since A is matched with B, it is highly likely that the entire face does not have the problem that the background is brought into focus. It can be determined that data of measuring a distance for A and B is reliable enough although the reliability is not as high as the case of A being nearly equal to B, and B being nearly equal to C.

In Step S402, if it is determined that the following is not held, the process goes to Step S403.
A is nearly equal to B.

Then, it is determined whether two in-focus positions are matched:
B: the in-focus position obtained from the measurement result based on the measurement frame corresponding to the in-face area, and
C: the in-focus position obtained from the measurement result based on the measurement frame corresponding to the body area. In other words, it is determined whether the following is held.
B is nearly equal to C.

If the above is held, the process goes to Step S411, and the matching point is the in-focus position.

This case is the case in which B is matched with C, but it is highly likely that A has the problem that the background is brought into focus. However, since B is matched with C, although it is unlikely that data of measuring a distance for B's in-face area has the problem of an unstable camera or an unstable subject, also in this case, it can be determined that data of measuring a distance for B and C is reliable enough.

In Step S403, if it is determined that the following is not held, the process goes to Step S404.
B is nearly equal to C.

In the face detecting part, the distance Df to the face is estimated from the detected size of the face. The estimation process is as described above with reference to FIG. 4.

The subject distance (Df) is determined from the following equation:

$$Df=Wref \times (f/Wi) \times (Ww/Wf)$$

where:
the human face size reference value is Wref,
the width of the imaging device is Wi,
the focal length is f,
the number of pixels of the human face size in the taken image (the value detected by the imaging device) is Wf, and
the number of pixels of the size of the image for use in human face detection (the value detected by the imaging device) is Ww Subsequently, in Step S405, the depth of view Ra corresponding to the subject distance (Df) is computed. The depth of view Ra is as described above with reference to FIGS. 13A and 13B, which corresponds to data that defines the error allowable to a certain distance to a single subject.

In Step S406, it is determined whether A is matched with
A: the in-focus position obtained from the measurement result based on the measurement frame corresponding to the face area, and
C: the in-focus position obtained from the measurement result based on the measurement frame corresponding to the body area. In other words, it is determined whether the following is held:
A is nearly equal to C.

If the above is held, the process goes to Step S407. It is determined whether there is the position corresponding to the position "A is nearly equal to C" within the depth of view Ra that corresponds to the distance Df to the face based on the size of the face detected in the face detecting part. If the position exists, the process goes to Step S411, and the position corresponding to the position "A is nearly equal to C" is the in-focus position. In the case in which A is matched with C, A and C have the problem that the background is brought into focus. However, when the matching point of A with C is within Ra, in such situations it is assumed that the problem does not occur that the background is brought into focus but the face does not come into focus. In this case, it is considered that the matching point of A with C is the in-focus position.

In Step S407, if it is determined that there is not the position corresponding to the position "A is nearly equal to C" within the depth of view Ra that corresponds to the distance Df to the face based on the size of the face detected in the face detecting part, it is determined that the in-focus position obtained from the measurement result based on the measurement frame is invalid. The process goes to Step S410, and it is determined that focusing has failed. In this case, a message of in-focus error is displayed, or the process is performed that the in-focus position is set at a preset default position, and the process is ended.

Moreover, in Step S406, if it is determined that A is not matched with C, the process goes to Step S408:
A: the in-focus position obtained from the measurement result based on the measurement frame corresponding to the face area, and
C: the in-focus position obtained from the measurement result based on the measurement frame corresponding to the body area. It is determined whether there is any one of the in-focus positions A, B and C within the depth of view Ra that corresponds to the distance Df to the face based on the size of the face detected in the face detecting part. If the in-focus position exists, the process goes to Step S409. The priority is set to the order of B, C and A as below, and the in-focus position is decided:

B: the in-focus position obtained from the measurement result based on the measurement frame corresponding to the in-face area, C: the in-focus position obtained from the measurement result based on the measurement frame corresponding to the body area, and A: the in-focus position obtained from the measurement result based on the measurement frame corresponding to the face area.

They are prioritized in ascending order of the likeliness of the occurrence of the problem that the background is brought into focus.

In Step S408, if it is determined that there is not any one of the in-focus positions A, B and C within the depth of view Ra that corresponds to the distance Df to the face based on the size of the face detected in the face detecting part, it is determined that the in-focus position obtained from the measurement result based on the measurement frame is invalid. The process goes to Step S410, and it is determined that focusing has failed. In this case, a message of in-focus error is displayed, or the process is performed that the in-focus position is set at a preset default position, and the process is ended.

As described above, in the imaging apparatus according to an embodiment of the invention, it is configured in which the measurement frame is set on the body area other than the face area, and data of the measurement results based on a plurality of the measurement frames is comprehensively thought to compute the in-focus position. Therefore, a more accurate focusing process, that is, auto-focus control can be implemented.

In addition, in the embodiment described above, it is described that it is the process for a single person in the image acquired in the imaging apparatus. For example, in the case in which the acquired image includes a plurality of people, it is possible that the priority is set to a plurality of people included in the image for processing in accordance with the set priority.

Figure 14:
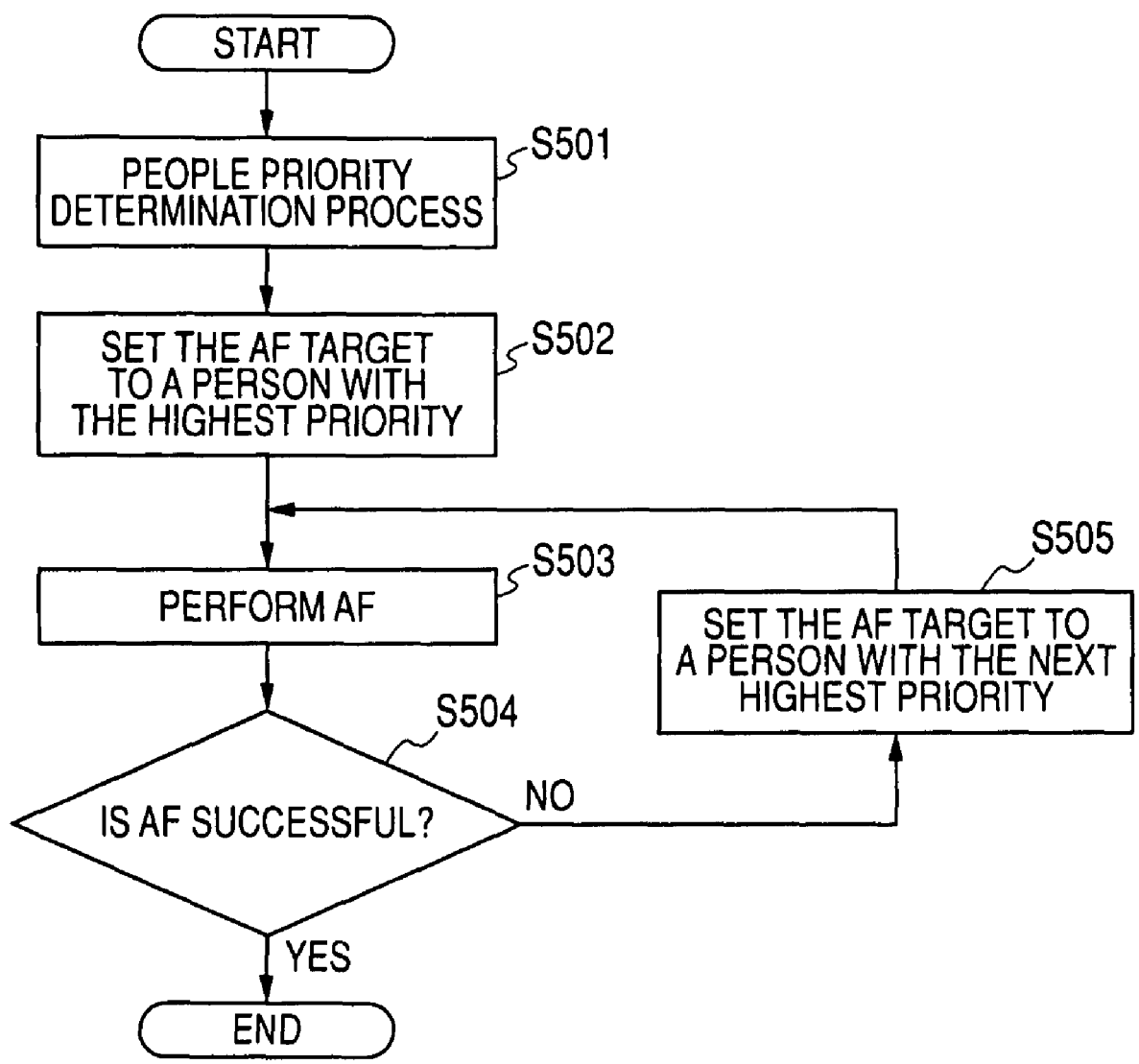
FIG. 14 shows a flow chart illustrative of the process sequence based on priority settings for a plurality of people.

The process sequence based on the priority will be described with reference to the flow chart shown in FIG. 14. First, in Step S501, the priority is decided for a plurality of people included in the acquired image. For example, the priority is set in accordance with a preset rule such as the size of the face, and the closeness from the center of the image.

Subsequently, in Step S502, a person having a higher priority is selected, and in Step S503, the decision process for the in-focus position (the auto-focus position) is performed. The decision sequence is performed as the process in accordance with the sequence described above with FIG. 12.

Subsequently, in Step S504, it is determined whether the in-focus position is successfully decided. If it is successful, the process is ended, whereas if it is unsuccessful, in Step S505, a person having a next higher priority is selected, and the selected person is the target for the decision process of the in-focus position (the auto-focus position) in Step S503. The decision sequence is performed as the process in accordance with the sequence described above with FIG. 12. As described above, the focusing process is in turn performed in accordance with the priority.

4. The Functional Configuration of the Imaging Apparatus

Figure 15:
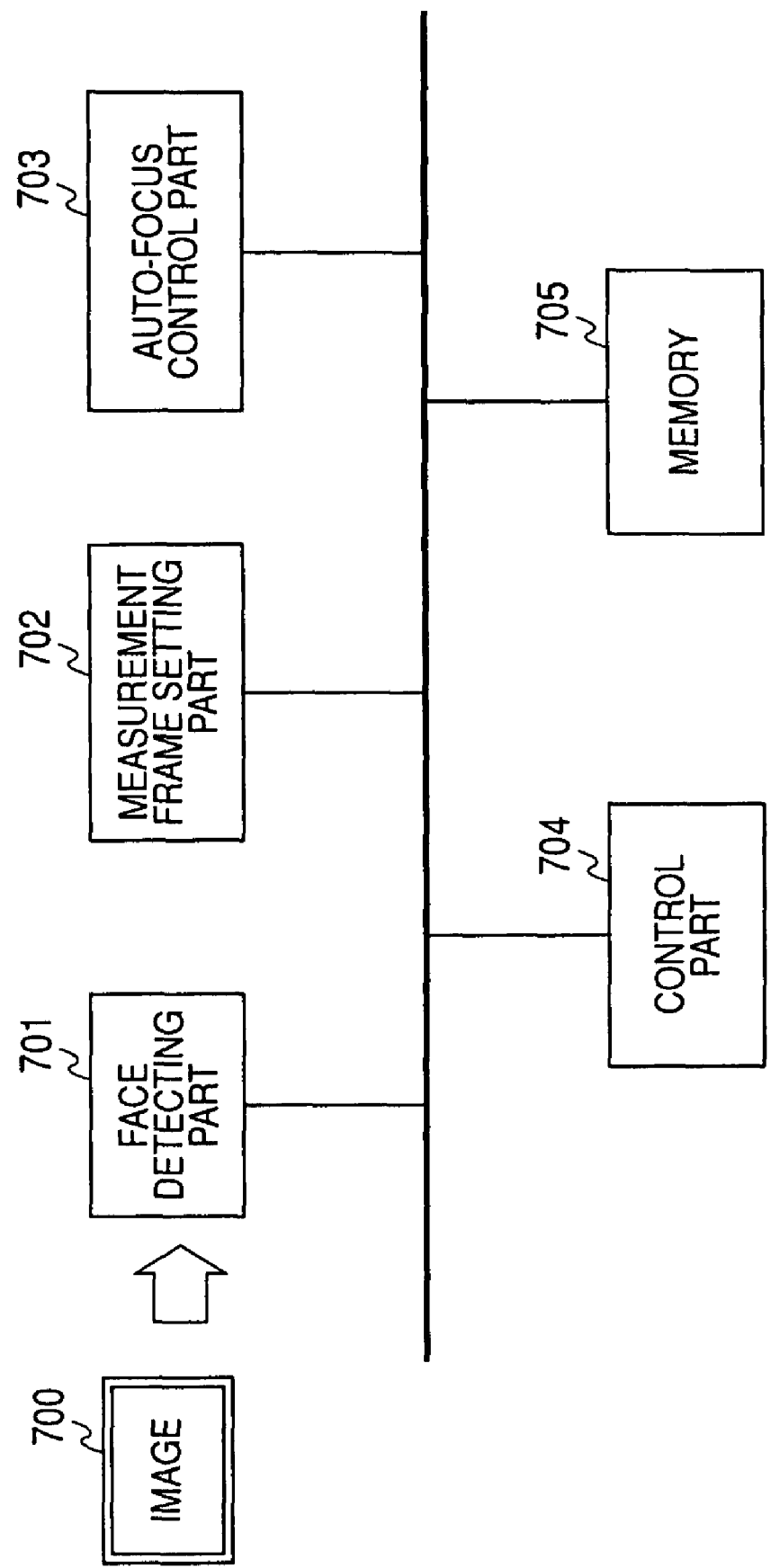
FIG. 15 shows a block diagram depicting the configuration and function of the imaging apparatus according to an embodiment of the invention.

Finally, the functional configuration for performing the process steps executed in the imaging apparatus according to an embodiment of the invention will be described with reference to FIG. 15. The process described above is performed in accordance with the program executed under control mainly done by the control part 110 by applying the hardware configuration described above with reference to FIG. 2. FIG. 15 shows a block diagram illustrative mainly of the function which is applied in performing this process.

Image information 700 acquired in the imaging apparatus is inputted to a face detecting part 701 through the imaging device and the digital signal processing part described with reference to FIG. 2. In the face detecting part 701, as described above, for example, the face area is determined and detected from the image information 700 by the process of matching with a template real image on which the brightness distribution information about the face is recorded. A measurement frame setting part 702 performs the process of setting the measurement frame corresponding to the face area that includes the face area and the measurement frame corresponding to the body area that includes the body area based on information about the face area detected in the face detecting part 701. In other words, the setting position and the size of three types of the measurement frames, and the measurement frames below are set:

the measurement frame corresponding to the face area that includes the entire face, the measurement frame corresponding to the in-face area that partially includes the in-face area, and the measurement frame corresponding to the body area that includes the body area other than the face.

A focus control part 703 applies each of three types of the measurement frames set by the measurement frame setting part 702, detects the in-focus positions corresponding to the individual measurement frames, and performs the decision process for the final in-focus position based on a check of information about the detected in-focus positions corresponding to the individual measurement frames. In other words, the focus control part measures the changes in the contrast in association with the movement of the focus lens for each of a plurality of different measurement frames, computes the in-focus positions corresponding to the individual measurement frames, and decides the final in-focus position based on a check of the in-focus position corresponding to the computed individual measurement frames. In addition, at this time, in the case in which the contrast of the image inside a plurality of the measurement frames is checked and the contrast of image data is low, the in-focus position information that has been computed by applying the measurement frame is invalid, and is not applied to computing the final in-focus position.

The final decision process of the focus position done by the focus control part is performed in accordance with the sequence described above with reference to FIG. 12. In other words, the in-focus positions corresponding to three types of the measurement frames below are checked:

(a) the in-focus position obtained from the measurement result to which the measurement frame corresponding to the face area that includes the entire face is applied, (b) the in-focus position obtained from the measurement result to which the measurement frame corresponding to the in-face area that partially includes the in-face area, and (c) the in-focus position obtained from the measurement result to which the measurement frame corresponding, to the body area that includes the body area other than the face.

In the case in which all the in-focus positions corresponding to the measurement frames are matched within a difference in a preset allowable range, or in the case in which at least two different in-focus positions corresponding to the measurement frames are matched within a difference in a preset allowable range, the process is performed that the matching point is decided as the in-focus position.

Furthermore, the focus control part 703 compares and checks distance information to the face computed from the size of the face area detected by the face detecting part 701 against a plurality of the in-focus positions obtained from the measurement results to which a plurality of the measurement frames is applied. In the case in which the difference between the in-focus position determined from distance information computed from the size of the face area detected by the face detecting part 701 and any one of the in-focus positions computed by applying the measurement frames is within a predetermined allowable range, it performs the process that the in-focus position obtained from the measurement result to which the measurement frame is applied is decided as the final in-focus position.

Moreover, as described above with reference to FIG. 8, the face detecting part 701 continuously detects the face area from the input image in the imaging apparatus. In the case in which the face area is successfully detected in the face detecting part 701, a control part 704 stores image information including at least any one of the brightness and color information about the detected image in the memory 705, whereas in the case in which the detection of the face area has failed, the control part checks whether the imaging apparatus is moved, and performs the process that sets a flag showing whether the position of the face area in the image that the face detection has been successful in the past is applicable as the position of the face area in the image that face detection has failed, and the flag is recorded on the memory 705 based on the comparison and check of the image information including at least any one of the brightness and color information between the image that face detection has failed and the image that the face detection has been successful in the past. In the case in which it is confirmed that the flag is referenced when face detection has failed and the position of the face area in the image that the face detection has been successful in the past is applicable, the measurement frame setting part 702 performs the measurement frame setting process to which the face area information about the image that the face detection has been successful in the past is applied.

In addition, as described above with reference to FIG. 14, in the case in which the face detecting part 701 detects a plurality of face areas in the input image in the imaging apparatus, the measurement frame setting part 702 performs the process that in turn selects a target person for setting a measurement frame in accordance with a preset priority.

In addition, in the embodiment described above, it is described that a digital still camera is assumed as the imaging apparatus, but an embodiment of the invention is applicable to any appliances in different forms such as a video camera and a cellular telephone with a camera as long as the appliances shoot people.

As described above, an embodiment of the invention has been described in detail with reference to specific implementations. However, it should be apparent that those skilled in the art could make modifications and substitutions of the embodiment within the scope of the teachings according to an embodiment of the invention. In other words, an embodiment of the invention has been disclosed in the exemplary forms, which should not be interpreted in limited ways. To understand the teachings of an embodiment of the invention, attached claims should be considered.

Furthermore, a series of the process steps described in the specification can be implemented by hardware, or software, or configurations combining both. When the process steps are implemented by software, a program having a process sequence recorded is installed in a memory inside a computer incorporated in dedicated hardware for implementation, or the program is installed in a multi-purpose computer feasible to run various process steps for implementation.

For example, the program can be recorded in advance on a hard disk or ROM (Read Only Memory) as a recording medium. Alternatively, the program can be stored (recorded) temporarily or permanently on a removable recording medium such as a flexible disk, a CD-ROM (Compact Disc Read Only Memory), a MO (Magneto optical) disk, a DVD (Digital Versatile Disc), a magnetic disk, a semiconductor memory, etc. Such a removable recording medium can be provided as so-called package software.

Moreover, in addition to installing the program in a computer through a removable recording medium as described above, the program can be installed in such a way that the program is transferred to a computer through a download site in radio, or to a computer via a network such as a LAN (Local Area Network), and the Internet in a wired manner, and then the computer receives the program thus transferred to install it in a recording medium such as a hard disk incorporated therein.

Moreover, various process steps described in the specification may be done in time series in accordance with the description as well as done in a parallel manner or separately depending on the processing performance of an apparatus to execute the process steps or as necessary. Furthermore, the system in the specification is a configuration of a logical assembly of a plurality of units, which is not limited to such a form that the units in individual configurations are in the same housing.

As discussed above, in the configuration according to an embodiment of the invention, it is configured in which the face area is detected from the image data acquired in the imaging apparatus, the measurement frame corresponding to the face area that includes a face area and the body measurement frame corresponding to the body area other than the face area are set based on the detected face area, the plurality of the measurement frames is applied to compute the in-focus positions corresponding to the individual measurement frames, and data of the in-focus positions corresponding to the computed plurality of the measurement frames is used to decide the final in-focus position. Therefore, in-focus errors are prevented such as errors of setting the in-focus position based on background information and setting errors of the in-focus position based on low contrast, and an accurate in-focus position can be decided.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus adapted for imaging of a subject having a face and a body contiguously connected to the face and for automatically focusing a subject image of the subject, the imaging apparatus comprising:

a face detecting part configured to detect a face area of the face of the subject from an input image in the imaging apparatus;

a measurement frame setting part configured to set a plurality of measurement frames including a face area measurement frame corresponding to the face area and a body area measurement frame corresponding to a body area of the body of the subject, the body area being spaced apart from the face area detected in the face detecting part; and a focus control part configured to apply each of the plurality of the measurement frames set by the measurement frame setting part to detect in-focus positions corresponding to at least the face area and body area measurement frames based on a check of information about the detected in-focus positions corresponding to the at least face area and body area measurement frames, and to decide a final in-focus position in order to automatically focus the subject image of the subject, wherein the face area measurement frame and the body area measurement frame are disposed apart and are completely different from one another.

2. The imaging apparatus according to claim 1,
wherein the focus control part is configured to measure changes in contrast in association with the movement of a focus lens for each of the plurality of measurement frames, compute in-focus positions corresponding to individual measurement frames, and decide a final in-focus position based on a check of in-focus positions corresponding to the computed individual measurement frames.

3. The imaging apparatus according to claim 1,
wherein the focus control part is configured to check contrast of an image inside the plurality of measurement frames set by the measurement frame setting part, and
in the case in which image data is low contrast, the focus control part is configured to invalidate in-focus position information that has been computed by applying a selected one of the plurality of measurement frames, and not to apply the information to computing a final in-focus position.

4. The imaging apparatus according to claim 1,
wherein in the case in which at least two different in-focus positions corresponding to the plurality of measurement frames are matched within a difference in a preset allowable range,
the focus control part is configured to decide the matching point thereof as an in-focus position.

5. The imaging apparatus according to claim 1,
wherein the focus control part is configured to compare and check distance information to a face computed from the size of the face area detected from the face detecting part against a plurality of in-focus positions obtained from the measurement results to which the plurality of measurement frames is applied, and
in the case in which there is a difference within a predetermined allowable range between the in-focus position determined from the distance information and any one of the plurality of the in-focus positions, the focus control part is configured to decide the in-focus position obtained from the measurement result to which the measurement frame is applied as a final in-focus position.

6. The imaging apparatus according to claim 1,
wherein in the case in which the face detecting part detects a plurality of face areas in an image inputted from the imaging apparatus, the measurement frame setting part is configured to in turn select a target person for setting one of the plurality measurement frames in accordance with a preset priority.

7. An imaging apparatus comprising:
a face detecting part configured to detect a face area from an input image in the imaging apparatus;
a measurement frame setting part configured to set a measurement frame corresponding to a face area that includes a face area and a measurement frame corresponding to a body area that includes a body area based on the face area detected in the face detecting part; and
a focus control part configured to apply each of the plurality of the measurement frames set by the measurement frame setting part to detect in-focus positions corresponding to the individual measurement frames based on a check of information about the detected in-focus positions corresponding to the individual measurement frames, and to decide a final in-focus position,
wherein the measurement frame setting part is configured to set three types of measurement frames below:
a measurement frame corresponding to a face area that includes an entire face;
a measurement frame corresponding to an in-face area that partially includes an in-face area; and
a measurement frame corresponding to a body area that includes a body area other than a face, and
the focus control part is configured to:
apply each of the three types of the measurement frames set by the measurement frame setting part,
detect in-focus positions corresponding to individual measurement frames, and
decide a final in-focus position based on a check of information about the detected in-focus positions corresponding to the individual measurement frames.

8. An imaging apparatus comprising:
a face detecting part configured to detect a face area from an input image in the imaging apparatus;
a measurement frame setting part configured to set a measurement frame corresponding to a face area that includes a face area and a measurement frame corresponding to a body area that includes a body area based on the face area detected in the face detecting part; and
a focus control part configured to apply each of the plurality of the measurement frames set by the measurement frame setting part to detect in-focus positions corresponding to the individual measurement frames based on a check of information about the detected in-focus positions corresponding to the individual measurement frames, and to decide a final in-focus position,
wherein based on face area information detected by the face detecting part, the measurement frame setting part is configured to decide a setting position and size of three types of measurement frames below:
a measurement frame corresponding to a face area that includes an entire face,
a measurement frame corresponding to an in-face area that partially includes an in-face area, and
a measurement frame corresponding to a body area that includes a body area other than a face, and
to set the individual measurement frames.

9. An imaging apparatus comprising:
a face detecting part configured to detect a face area from an input image in the imaging apparatus;
a measurement frame setting part configured to set a measurement frame corresponding to a face area that includes a face area and a measurement frame corresponding to a body area that includes a body area based on the face area detected in the face detecting part; and
a focus control part configured to apply each of the plurality of the measurement frames set by the measurement frame setting part to detect in-focus positions corresponding to the individual measurement frames based on a check of information about the detected in-focus positions corresponding to the individual measurement frames, and to decide a final in-focus position,
wherein the focus control part is configured to check three types of in-focus positions corresponding to measurement frames below:

(a) an in-focus position obtained from a measurement result to which a measurement frame corresponding to a face area that includes an entire face is applied;
(b) an in-focus position obtained from a measurement result to which a measurement frame corresponding to an in-face area that partially includes an in-face area; and
(c) an in-focus position obtained from a measurement result to which a measurement frame corresponding to a body area that includes a body area other than a face, and in the case in which all the in-focus positions corresponding to the measurement frames are matched within a difference in a preset allowable range, or in the case in which at least two different in-focus positions corresponding to measurement frames are matched within a difference in a preset allowable range, the focus control part is configured to decide the matching point thereof as an in-focus position.

10. An imaging apparatus comprising:
a face detecting part configured to detect a face area from an input image in the imaging apparatus;
a measurement frame setting part configured to set a measurement frame corresponding to a face area that includes a face area and a measurement frame corresponding to a body area that includes a body area based on the face area detected in the face detecting part; and
a focus control part configured to apply each of the plurality of the measurement frames set by the measurement frame setting part to detect in-focus positions corresponding to the individual measurement frames based on a check of information about the detected in-focus positions corresponding to the individual measurement frames, and to decide a final in-focus position,
wherein the face detecting part is configured to continuously detect a face area from an input image in the imaging apparatus,
a control part of the imaging apparatus is configured to store image information including at least any one of brightness and color information about the detected image in a memory in the case in which a face area is successfully detected in the face detecting part, and
in the case in which detection of a face area is failed, the control part is configured to check whether the imaging apparatus is moved, based on comparison and check of image information including at least any one of brightness and color information between an image that face detection has been failed and an image that face detection has been successful in the past, set a flag showing whether a position of a face area in the image that face detection has been successful in the past is applicable as a position of a face area in the image that face detection has been failed, and record it on the memory, and
the measurement frame setting part is configured to reference to the flag when face detection is failed, and in the case in which it is confirmed that a position of a face area in the image that face detection has been successful in the past is applicable, the measurement frame setting part is configured to perform a measurement frame setting process to which face area information about image that face detection has been successful in the past is applied.

11. A control method of an imaging apparatus which is adapted for imaging of a subject having a face and a body contiguously connected to the face and performs auto-focus control in the imaging apparatus, the method comprising the steps of:
in a face detecting part, detecting a face area of the face of the subject from an input image in the imaging apparatus;
in a measurement frame setting part, setting a face area measurement frame corresponding to the face area and a body area measurement frame corresponding to a body area of the body of the subject, the body area being spaced apart from the face area detected in the face detecting part; and
in a focus control part, applying at least the face area and body area measurement frames set in the measurement frame setting step to detect in-focus positions corresponding to the at least face area and body area measurement frames based on a check of information about the detected in-focus positions corresponding to the at least face area and body area measurement frames, and deciding a final in-focus position in order to automatically focus a subject image of the subject,
wherein the face area measurement frame and the body area measurement frame are disposed apart and are completely different from one another.

12. A non-transitory computer-readable medium tangibly embodying computer-executable instructions that when executed by a computer performs steps, the steps comprising:
providing a subject having a face and a body contiguously connected to the face;
in a face detecting part, detecting a face area of the face of the subject from an input image in the imaging apparatus;
in a measurement frame setting part, setting a face area measurement frame corresponding to a face area and a body area measurement frame corresponding to a body area of the body of the subject, the body area being spaced apart from the face area detected in the face detecting part; and
in a focus control part, applying each of the face area and body area measurement frames set in the measurement frame setting step to detect in-focus positions corresponding to the face area and body area measurement frames based on a check of information about the detected in-focus positions corresponding to the face area and body area measurement frames, and deciding a final in-focus position in order to automatically focus a subject image of the subject,
wherein the face area measurement frame and the body area measurement frame are disposed apart and are completely different from one another.

* * * * *